United States Patent [19]
Theodoracatos

[11] Patent Number: 5,513,276
[45] Date of Patent: Apr. 30, 1996

[54] APPARATUS AND METHOD FOR THREE-DIMENSIONAL PERSPECTIVE IMAGING OF OBJECTS

[75] Inventor: Vassilios E. Theodoracatos, Norman, Okla.

[73] Assignee: The Board of Regents of the University of Oklahoma, Norman, Okla.

[21] Appl. No.: 253,006

[22] Filed: Jun. 2, 1994

[51] Int. Cl.$^6$ .................................................. G06K 9/00
[52] U.S. Cl. ........................ 382/154; 382/106; 356/376
[58] Field of Search .............................. 348/94, 95, 135, 348/139, 140, 128, 43; 382/1, 8, 41, 106, 286, 291, 108, 154; 356/376, 375, 377

[56] References Cited

U.S. PATENT DOCUMENTS

| | | | |
|---|---|---|---|
| 3,644,013 | 2/1972 | Gould | 350/3.5 |
| 3,918,814 | 11/1975 | Weiser | 356/156 |
| 4,492,472 | 1/1985 | Asano et al. | 356/376 |
| 4,687,326 | 8/1987 | Corby, Jr. | 356/5 |
| 4,846,576 | 7/1989 | Maruyama et al. | 356/376 |
| 4,927,263 | 5/1990 | de Groot et al. | 356/5 |
| 4,979,815 | 12/1990 | Tsikos | 356/1 |
| 5,004,335 | 4/1991 | Montes | 352/58 |
| 5,018,854 | 5/1991 | Rioux | 356/376 |
| 5,027,281 | 6/1991 | Rekow et al. | 364/474.24 |
| 5,028,799 | 7/1991 | Chen et al. | 250/561 |
| 5,049,987 | 9/1991 | Hoppenstein | 358/88 |
| 5,054,926 | 10/1991 | Dabbs et al. | 356/345 |
| 5,082,350 | 1/1992 | Garcia et al. | 359/478 |
| 5,082,362 | 1/1992 | Schneiter | 356/1 |
| 5,102,224 | 4/1992 | Uesugi | 356/376 |
| 5,132,839 | 7/1992 | Travis | 359/462 |
| 5,162,787 | 11/1992 | Thompson et al. | 340/794 |
| 5,172,266 | 12/1992 | Garcia et al. | 359/478 |
| 5,179,428 | 1/1993 | Lee | 257/233 |
| 5,193,120 | 3/1993 | Gamache et al. | 382/1 |
| 5,196,900 | 3/1993 | Pettersen | 356/141 |
| 5,214,419 | 5/1993 | DeMond et al. | 340/794 |

OTHER PUBLICATIONS

"Accurate linear technique for camera calibration considering lens distortion by solving an eigenvalue problem" by Shih, Hung, and Lin; Optical Engineering, Jan. 1993, vol. 32 No. 1, pp. 138 thru 149.

"Occlusion-free 3D Recovery Using Mirror Images," by Kozo Okazaki et al., 1988, pp. 17–19.

"Dynamic Occlusion Analysis in Optical Flow Fields," by William B. Thompson et al., *IEEE Transactions on Pattern Analysis and Machine Intelligence,* vol. PAMI-7, No. 4, Jul. 1985, pp. 374–383.

(List continued on next page.)

Primary Examiner—Joseph Mancuso
Assistant Examiner—Baeil P. Park
Attorney, Agent, or Firm—Dunlap & Codding

[57] ABSTRACT

An apparatus for creating a three-dimensional perspective image of an object surface. The apparatus includes a laser, a computer system and a video camera with a sensor matrix. The laser is moved to a plurality of positions to project a light ray upon an object surface. Each projected light ray is parallel to the optical axis of the video camera. The sensor matrix of the video camera detects an image area corresponding to each one of the projected light rays. The computer system identifies an image point from each image area, calculates an image of the object surface defined by three-dimensional grid coordinates and transforms the image coordinates into three-dimensional coordinates which define the real object surface. In another embodiment, a number of lasers are arranged in an array to project parallel light rays upon the object surface. The lasers are actuated according to a predetermined sequence to project parallel light rays upon the object surface one at a time. In yet another embodiment, a plane of laser light may be directed on the object surface to produce a laser stripe on the object and an image stripe in the sensor matrix. Each point of the image stripe is correlated with a laser point and three-dimensional grid coordinate is calculated from the points of the image stripe and the corresponding laser points.

17 Claims, 6 Drawing Sheets

OTHER PUBLICATIONS

"Model Construction and Shape Recognition from Occluding Contours," by Chiun–Hong Chien et al., *IEEE Transactions on Pattern Analysis and Machine Intelligence*, vol. 11, No. 4, Apr. 1989, pp. 372–388.

"Occlusions as a Guide for Planning the Next View," by Jasna Maver et al., *IEEE Transactions on Pattern Analysis and Machine Intelligence*, vol. 15, No. 5, May 1993, pp. 417–432.

"A Versatile Camera Calibration Technique for High–Accuracy 3D Machine Vision Metrology Using Off–the–Shelf TV Cameras and Lenses," by Roger Y. Tsai, *IEEE Journal of Robotics and Automation*, vol. RA–3, No. 4, Aug. 1987, pp. 323–344.

"Single Lens Stereo with a Plenoptic Camera," by Edward H. Adelson et al., *IEEE Transactions on Pattern Analysis and Machine Intelligence*, vol. 14, No. 2, Feb. 1992, pp. 99–106.

"Camera Calibration with Distortion Models and Accuracy Evaluation," by Juyang Weng et al., *IEEE Transactions on Pattern Analysis and Machine Intelligence*, vol. 14, No. 10, Oct. 1992, pp. 965–980.

"Techniques for Calibration of the Scale Factor and Image Center for High Accuracy 3–D Machine Vision Metrology," by Reimar K. Lenz et al., *IEEE Transactions on Pattern Analysis and Machine Intelligence*, vol. 10, No. 5, Sep. 1988, pp. 713–720.

"3–D Position Sensing Using a Passive Monocular Vision System," by John Cardillo et al., *IEEE Transactions on Pattern Analysis and Machine Intelligence*, vol. 13, No. 8, Aug. 1991, pp. 809–813.

"3–D Surface Description from Binocular Stereo," by Steven D. Cochran et al., *IEEE Transactions on Pattern Analysis and Machine Intelligence*, vol. 14, No. 10, Oct. 1992, pp. 981–994.

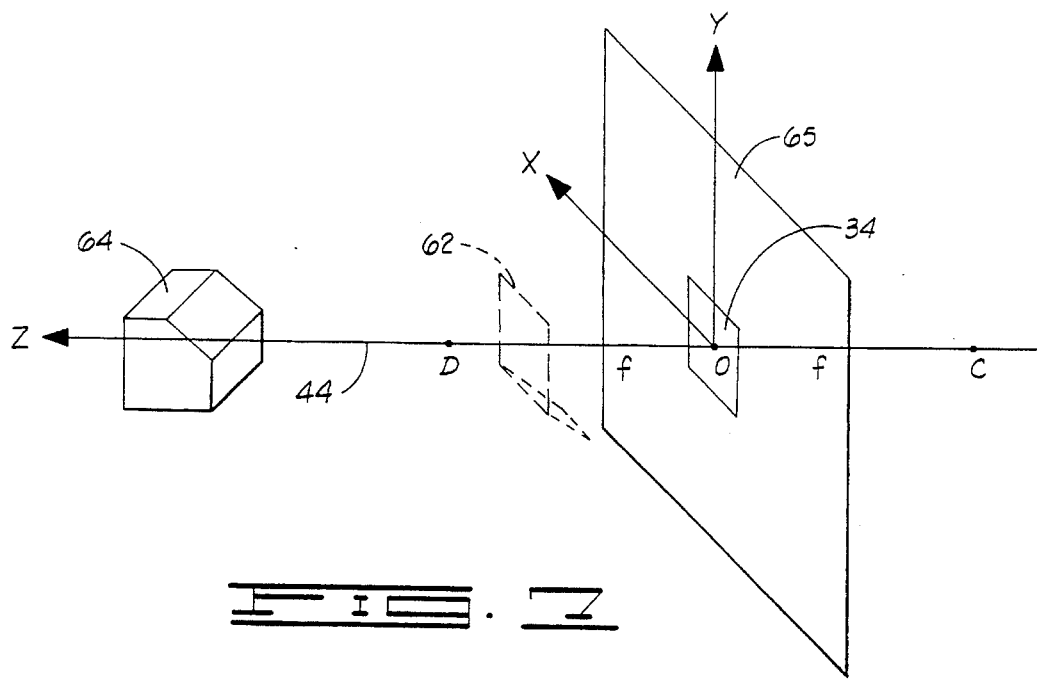
FIG. 7
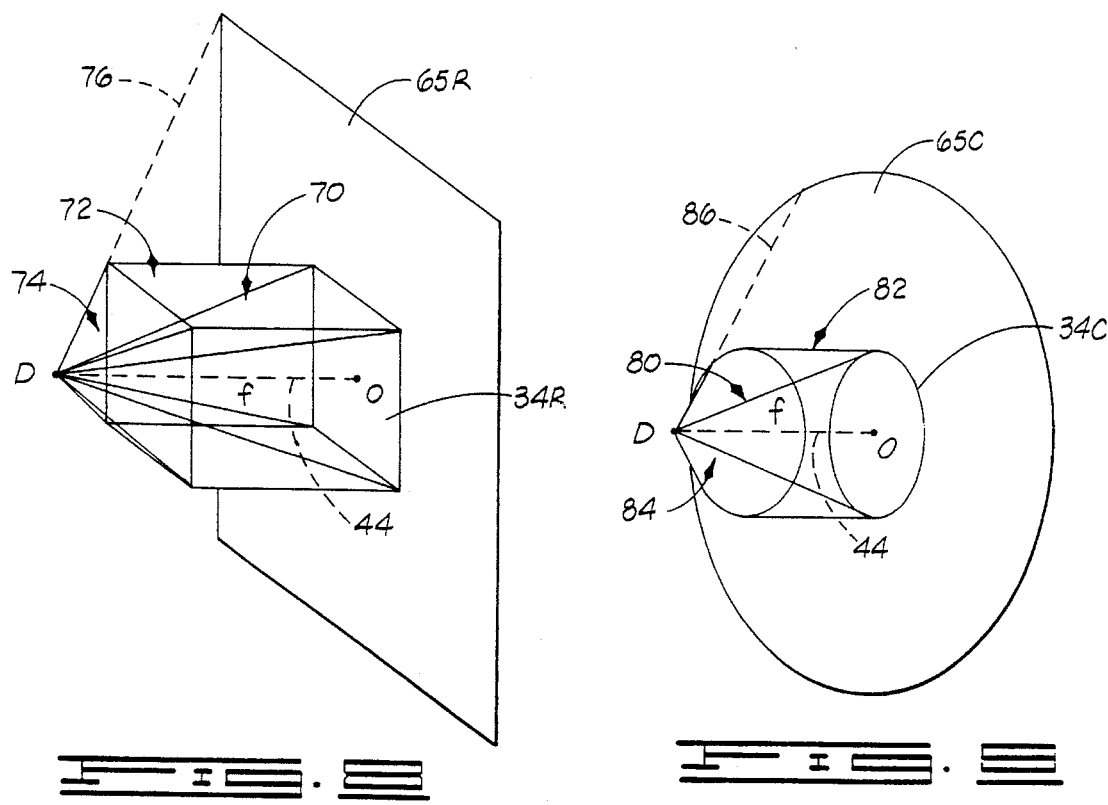
FIG. 8
FIG. 9

5,513,276

APPARATUS AND METHOD FOR THREE-DIMENSIONAL PERSPECTIVE IMAGING OF OBJECTS

BACKGROUND OF THE INVENTION

1. Field of the Invention

The present invention relates generally to apparatus for producing three-dimensional images and computer models of objects. In particular, but not by way of limitation, the present invention relates to apparatus which utilize a light source, a camera and a computer system to create computer images of objects.

2. Description of Related Art

In automated manufacturing industries, there has always been a need for automatic inspection of manufactured components. Some inspection systems utilize physical tools which inspect a component by making contact with the component to determine the shape and dimensions of the component. Contact-based inspection systems typically have numerous moving parts which tend to wear out and fail.

In order to eliminate the use of physical tools, non-contact systems utilize computer vision technology. Many of the non-contact systems are feature-based and perform considerable image processing to detect features, such as edges, to inspect objects. Such systems are typically time-consuming, hard to use for inspecting complex components, and difficult to change for inspecting a variety of components.

SUMMARY OF THE INVENTION

An apparatus constructed in accordance with the present invention includes a video camera with a sensor matrix, a light source and a computer system. The light source is adapted to direct a beam of light toward an object from an array of points. The light beam from each point is parallel to the optical axis of the camera, perpendicular to the sensor matrix, and at a known grid coordinate in the plane of the sensor matrix.

The sensor matrix senses the light beam from the object, also at a known coordinate in the plane of the sensor matrix. The computer system comprises software and hardware which construct a three-dimensional image of the object from the focal length of the camera and the known grid coordinates of the light beam and the light reaching the plane of the sensor matrix.

The computer system then applies an inverse perspective transformation to convert the image grid coordinates into real grid coordinates of the object. The real grid coordinates of the object may then be compared with a model for the object to inspect the object for defects.

One object of the present invention is to provide an apparatus capable of constructing a three-dimensional computerized representation of an object without making physical contact with the object.

Another object of the present invention is to provide an apparatus which images an object such that portions of the object are not occluded by features of the object from the perspective of the camera.

Yet another object of the present invention is to provide an apparatus which can be used to inspect a wide variety of components without extensive image processing of component features.

Still another object of the present invention is to provide an apparatus which produces three-dimensional perspective images for use in applications such as manufacturing inspection, three-dimensional television, and three-dimensional video recording.

Other objects, features and advantages of the present invention are apparent from the following detailed description when read in conjunction with the accompanying drawings and appended claims.

BRIEF DESCRIPTION OF THE DRAWINGS

FIG. 7 is a diagram illustrating the construction of the three-dimensional image of an object.

FIG. 8 is a diagram illustrating the inner and outer boundaries for the 3-D image of an object with a square sensor area and a square laser area.

FIG. 9 is a diagram illustrating the inner and outer boundaries for the 3-D image of an object when utilizing a circular sensor area and a circular laser area.

DETAILED DESCRIPTION OF THE PREFERRED EMBODIMENTS

Figure 1:
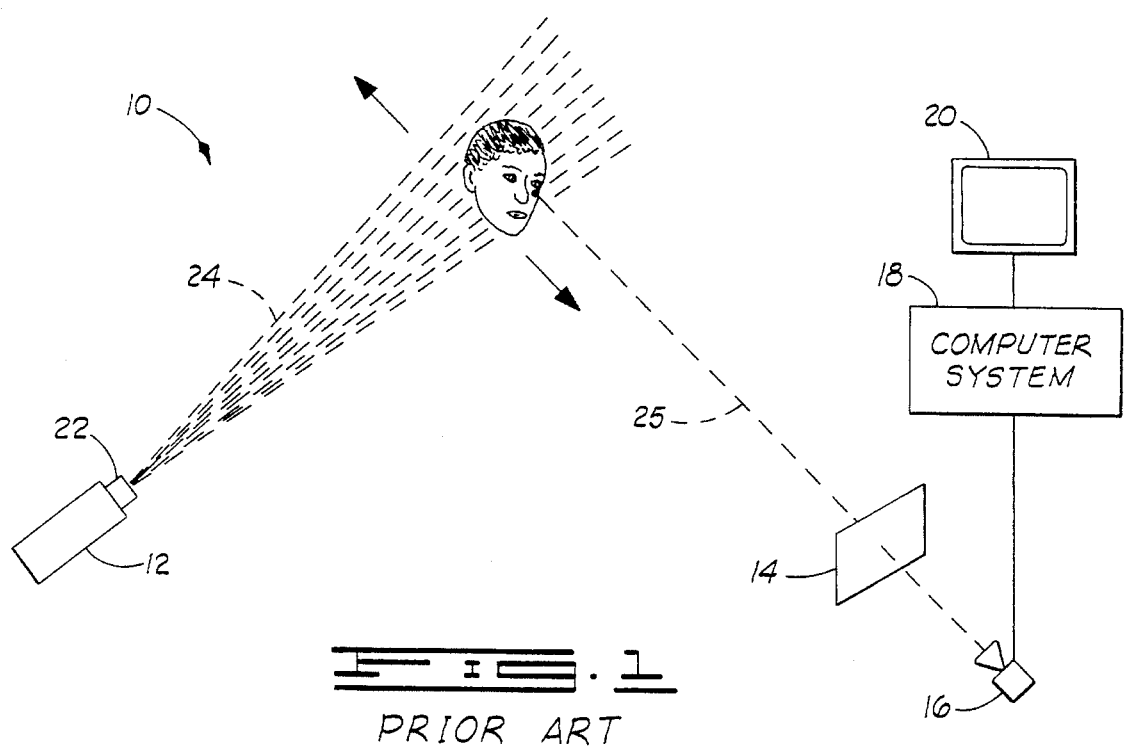
FIG. 1 is a partly diagrammatical, perspective view illustrating the occlusion problem of a prior art imaging system.

Referring to the drawings in general, and to FIG. 1 in particular, shown therein and designated by the general reference numeral 10 is a prior art imaging system, which includes a laser 12, a sensing plane 14, a video camera 16 and a computer system 18 with a display monitor 20. The prior art system 10 is similar to the one disclosed in U.S. Pat. No. 4,979,815, issued to Tsikos.

A cylindrical lens 22 is used with the laser 12 to produce a plane 24 of laser light. The object, which is a human face in FIG. 1, is moved through the plane 24 of laser light. The viewing axis 25 of the camera 16 is arranged at an angle in the range of 10 to 80 degrees with respect to the plane 24 of the laser 12.

The camera 16 is a charge-coupled device (CCD), which receives images of the laser "stripe" produced by the plane 24 of laser light being projected onto the human face. The computer system 18 is interfaced with the camera 16 and includes the processing capability to create an image of the human face from the images of laser stripes.

An occlusion problem with the prior art system 10 is illustrated by in FIG. 1. As the nose of the human face passes through the laser plane 24, an area of the human face behind the nose is occluded. Accordingly, the system 10 cannot image the area occluded by the nose.

Another disadvantage of the prior art system 10 is that the object being imaged is moved through the laser plane 24 by a conveyor of some sort. In some cases, it may be desirable to image objects which cannot be moved.

Yet another disadvantage of the prior art system 10 is its space requirement. By placing the laser 12 at an angle of up to 80 degrees from viewing axis 25 of the camera 16, the system 10 must have a substantial amount of space.

Figure 2:
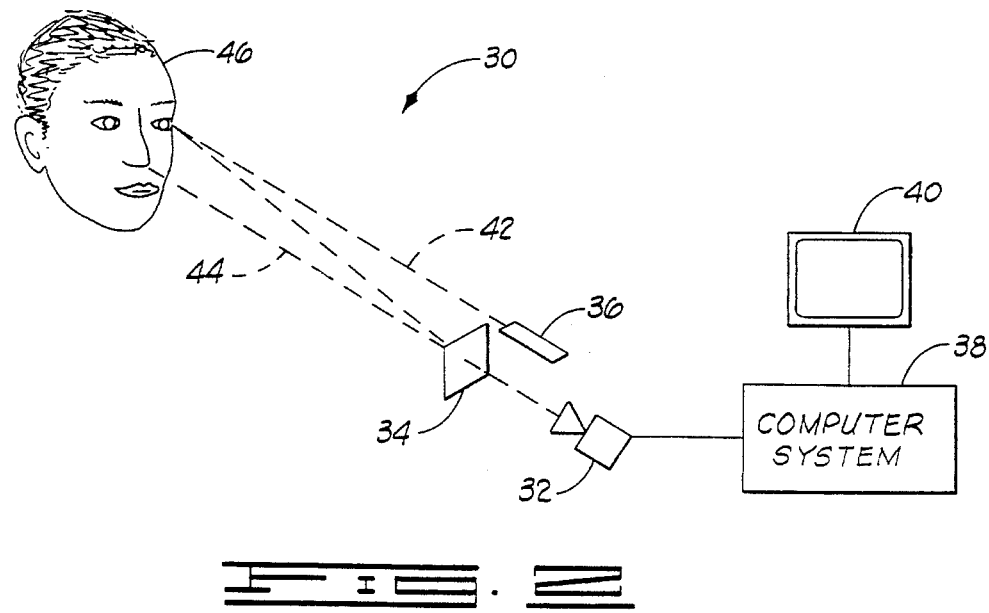
FIG. 2 is a partly diagrammatical, perspective view of an apparatus constructed in accordance with the present invention.

Turning now to FIG. 2, shown diagrammatically therein is an apparatus 30 constructed in accordance with the present invention. The apparatus 30 includes a video camera 32 with a sensor matrix 34, a laser 36 and a computer system 38 with a video monitor 40.

The computer system 38 used is a Silicon Graphics Personal Iris Workstation operating at 12.5 MHz. The workstation includes 8 MB of memory and a MIPS R2000A microprocessor.

Furthermore, the workstation includes the monitor 40, which is typically a 60-Hz non-interlaced 19-inch color monitor with 1280×1024 resolution. The workstation is available from Silicon Graphics Computer Systems in Mountain View, Calif.

The computer system 38 also includes an Imaging Technology Series 100 image processing board and ITEX100 image processing software with math library, which are used for image processing requirements. The image processing board captures television standard (RS-170) video signals at 30 frames per second. The image processing board and software are available from Imaging Technology, Inc. in Huntington Beach, Calif.

Another component of the computer system 38 is software written in "C" language to perform imaging of objects. The "C" language software works in conjunction with the ITEX100 software and math library to digitize image points. A listing of the "C" language computer software is appended hereto.

The laser 36 projects a ray 42 of light toward the object to be imaged. The laser 36 is positioned such that the laser ray 42 is parallel to the optical axis 44 of the camera 32. With this arrangement, the nose does not occlude any area of the human face 46 from the perspective of the camera 32.

The laser 36 is moved to a plurality of positions, one at a time, to construct an array of points around the sensor matrix 34 and covering the viewing area of the object 46 to be imaged. Each of the laser positions is parallel to the optical axis 44 of the camera 32.

A 670 nm wavelength diode laser is utilized to project beams of laser light onto the object. The model MDL-200-670-10 diode laser available from Lasermax, Inc. in Rochester, N.Y. is a suitable device for the laser 36.

The video camera 32 is typically a model CID-2710-A2, which may be acquired from CIDTEC Technologies in Liverpool, N.Y. The video camera 32 includes a 776×512 matrix of sensors 34, which generates analog signals in response to the laser beam. The analog signals are converted to digital signals by an analog-to-digital converter in the image processor board and software of the computer system 38.

The sensor matrix 34 of the camera 32 senses the point of laser light on the object at a particular area of the sensor matrix 34. The computer system 38 is interfaced with the camera 32 to determine the area of the sensor matrix 34 which senses the light of each laser point.

It should be appreciated that the points digitized by the ITEX100 software are a cluster or blob. That is, the ITEX100 software does not digitize one pixel, but a cluster of pixels. The "C" language computer program uses moment techniques to find the centroid of the cluster as a single digitized point or pixel.

It should be appreciated that the hardware and software of the computer system 38 cooperate to produce a three-dimensional computer image of the real object from the grid coordinates of laser points, the grid coordinates of the sensor matrix 34 and the focal length of the camera 32. In addition, the hardware and software of the computer system 38 convert the image into a computer model of the real object.

In one embodiment of the present invention, one laser 36 may be used and moved manually to various points in sequence around the sensor matrix 34 of the camera 32. The grid coordinates corresponding to each laser position are manually keyed into the computer system 38. Although this arrangement only requires one laser 36, it is somewhat cumbersome and time-consuming to operate.

Figure 3:
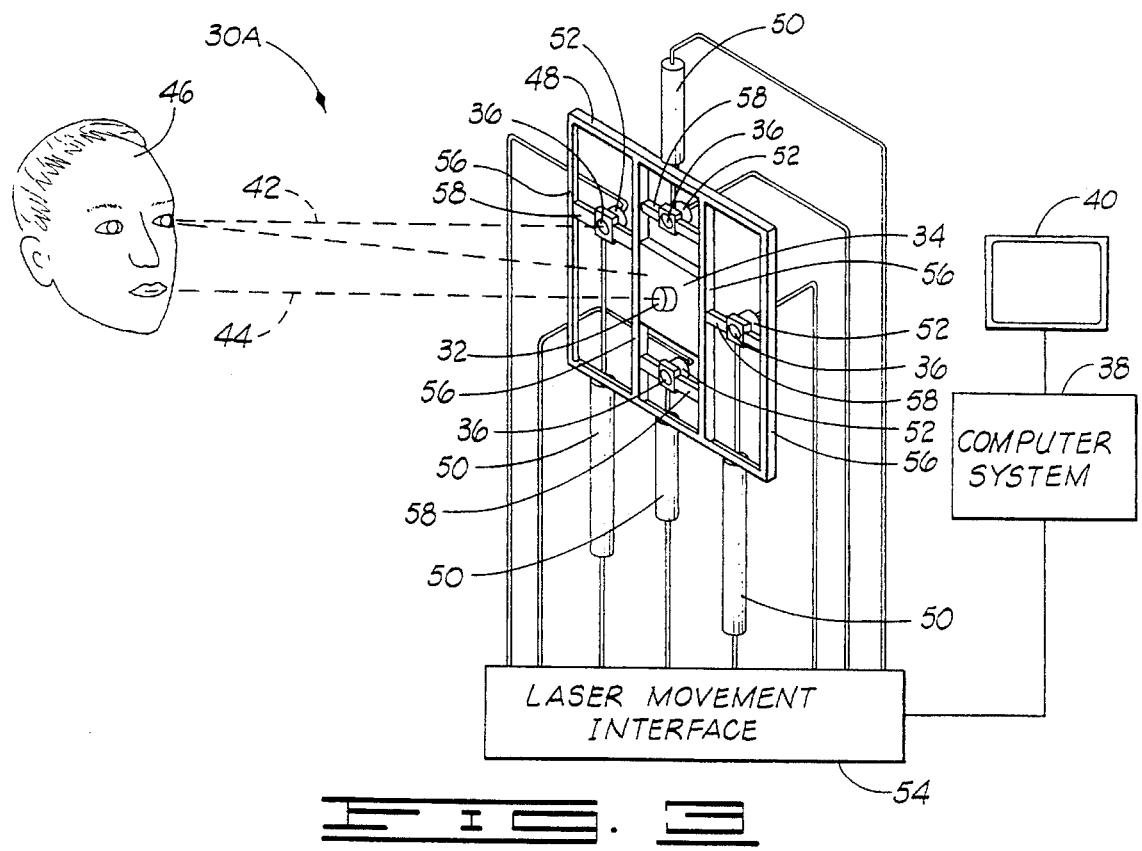
FIG. 3 is a partly diagrammatical, perspective view of an embodiment of the present invention wherein four lasers are moved to various points parallel with the optical axis of the camera in a predetermined sequence.

Turning now to FIG. 3, shown therein and designated by reference character 30A is an apparatus which moves four lasers 36 to positions around the sensor matrix 34 of the video camera 32 to image an object 46. The apparatus 30A includes a frame 48, the camera 32 with sensor matrix 34, four lasers 36, four vertical actuators 50, four horizontal actuators 52, a laser movement interface 54 and the computer system 38.

The camera 32 and sensor matrix 34 are rigidly mounted in the center of the frame 48, which includes four vertical channel members 56. Four slide bars 58 are provided and each slide bar 58 extends horizontally between a corresponding pair of the vertical channel members 56.

Each vertical actuator 50 is connected to a corresponding one of the slide bars 58 to provide vertical movement of the slide bar 58. Electric cylinders or any conventional devices for providing reciprocating movement may be used for the vertical actuators 50. The vertical actuators 50 should be mounted to remain vertically oriented.

Each laser 36 is mounted to a corresponding one of the slide bars 58 for horizontal movement along the corresponding slide bar 58. A corresponding one of the horizontal actuators 52 is connected to each laser 36 to drive the horizontal movement of the laser 36. Electric cylinders, servomotors or the like may be utilized as the horizontal actuators 52.

The vertical actuators 50 and the horizontal actuators 52 are connected to the laser movement interface 54, which may include a conventional logic controller and electromechanical components for controlling the movement of the vertical actuators 50 and the horizontal actuators 52. In turn, the laser movement interface 54 is connected to the computer system 38 to coordinate the movement of the lasers 36 with the processing of the computer system 38.

The computer system 38 switches the lasers 36 on to project a laser beam 42, one at a time, and instructs the laser movement interface 54 to move the projecting laser 36 to a number of predetermined positions according to a predefined sequence. Each predetermined position of each laser 36 is defined by grid coordinates, designated herein as $X_A$ and $Y_A$.

The camera 32 is connected to the image board of the computer system 38 in order to provide the computer system 38 with the area of the sensor matrix 34 which senses the laser beam 42 projected on the object 46. The sensing point of the sensor matrix 34 corresponding to each laser position is defined herein by grid coordinates $X_B$ and $Y_B$.

Figure 4:
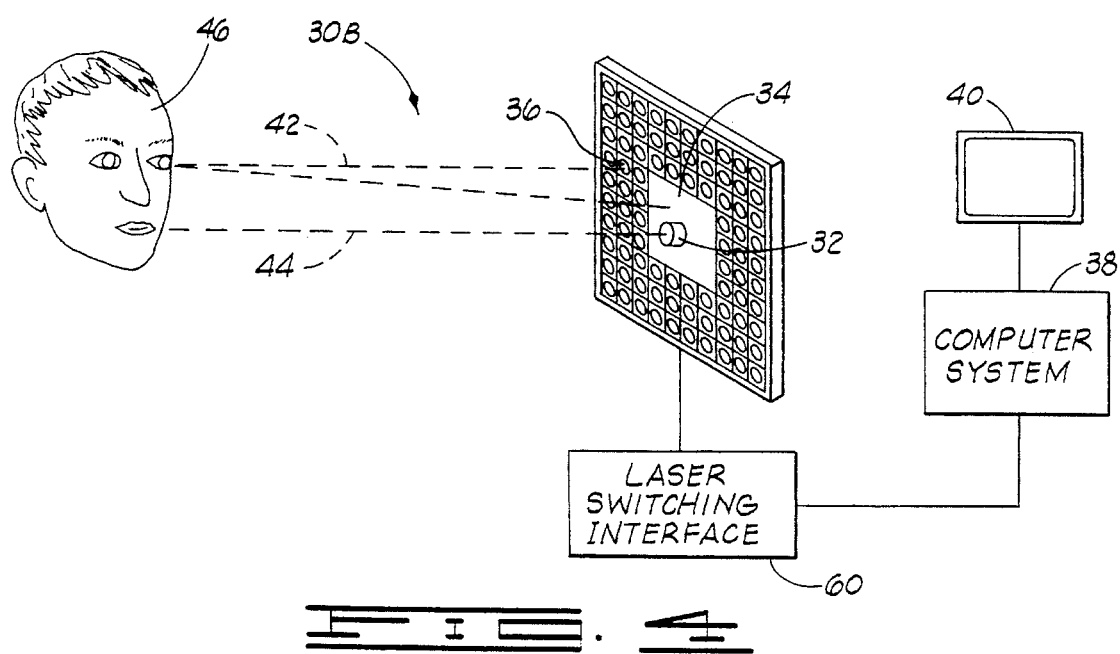
FIG. 4 is a partly diagrammatical, perspective view of an embodiment of the present invention wherein each laser of a laser array is switched on in a predetermined sequence.

Referring now to FIG. 4, shown therein and designated by reference character 30B is another embodiment of the present invention. Rather than one or four lasers 36, the apparatus 30B includes a multiplicity of lasers 36 arranged in a laser array around the sensing matrix 34 of the camera 32. For clarity of illustration, only one of the lasers is designated by reference numeral 36 in FIG. 4.

The array of lasers 36 is connected to a laser switching interface 60, which is adapted to switch each laser 36 on one at a time. In turn, the laser switching interface 60 is connected to the computer system 38 so that the operation of the laser switching interface 60 is coordinated with the processing of the computer system 38.

The laser switching interface 60 powers on the lasers 36 one at a time according to a predetermined sequence and the computer system 38 constructs an image point for each laser point on the object 46. It should be appreciated that each laser 36 of the laser array has a known grid coordinate ($X_A$, $Y_A$) and that the sensor matrix 34 of the camera 32 produces a unique area of pixels corresponding to each laser 36.

Figure 5:
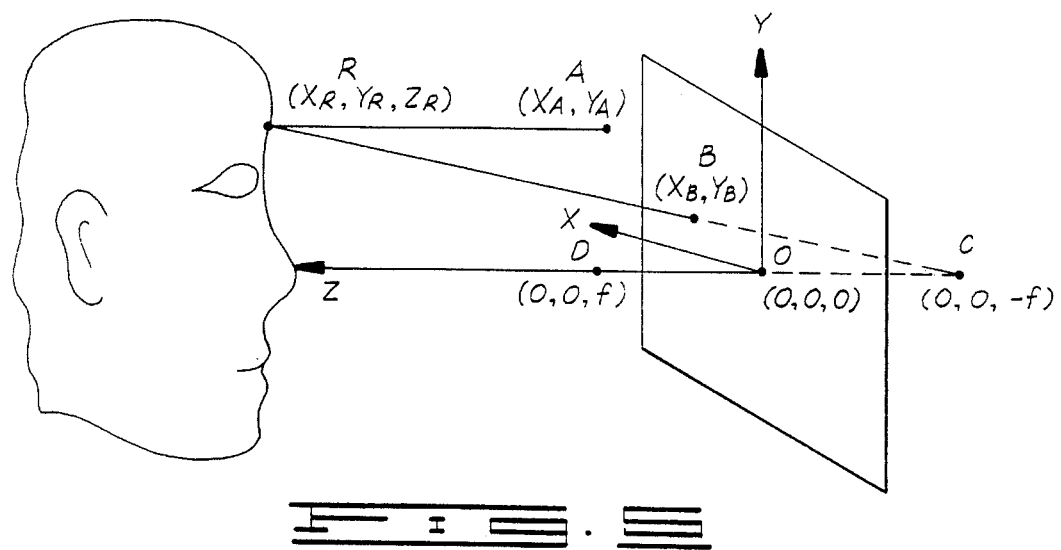
FIG. 5 is a diagram illustrating the geometry of the camera, the sensor matrix plane, the laser position and the object to be imaged.

With reference now to FIG. 5, shown therein is a diagram illustrating the geometry of the apparatus 30, 30A and 30B. The plane of the sensor matrix 34 of the camera 32 is defined as the X-Y plane and the optical axis 44 of the camera 32 is defined as the Z-axis. The origin of the X-Y-Z coordinate system is the center of the plane of the sensor matrix 34.

Along the optical axis 44 (Z-axis), the center of projection of the camera 32 is point C at (0, 0, -f) and the vanishing point of the camera 32 is point D at (0, 0, f), where f is the focal length of the camera 32. As mentioned hereinabove, point A at ($X_A$, $Y_A$) is the position of the laser beam in the X-Y plane and point B at ($X_B$, $Y_B$) is the point sensed by the sensor matrix 34 of the camera 32. The goal is to determine point R at ($X_R$, $Y_R$, $Z_R$), which is the point of the laser beam projected on the real object 46.

Figure 6:
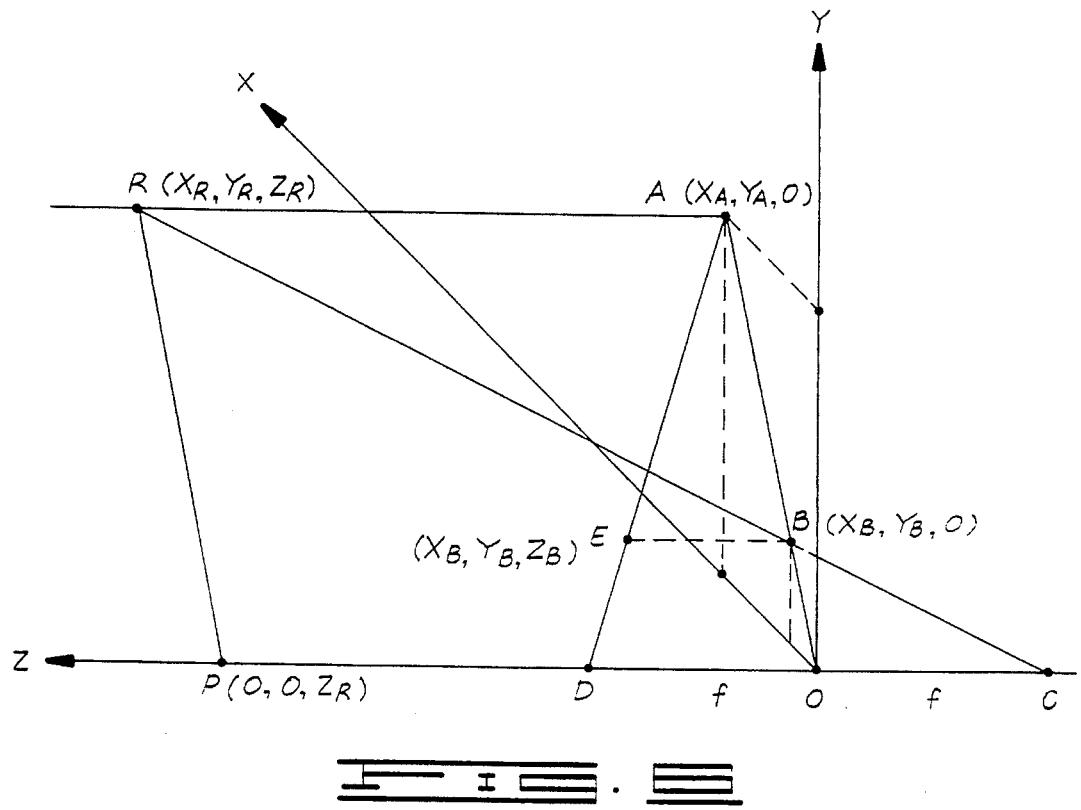
FIG. 6 is a diagram illustrating the computation of the perspective depth of the image coordinates of the object from the focal length of the camera and the grid coordinates of the laser and the sensor.

With reference now to FIG. 6, shown therein is a diagram illustrating the calculation of the 3-D image point E at coordinates ($X_B$, $Y_B$, $Z_B$). The coordinates $X_B$ and $Y_B$ are known from the sensor matrix 34 of the camera 32. The coordinate in the Z-direction, $Z_B$, is calculated from the focal length f of the camera and known geometric relationships. From triangle DOA, $$\frac{Z_B}{f} = \frac{AB}{OA} = \frac{OA - OB}{OA} = 1 - \frac{OB}{OA} \quad (1)$$

Expressed in terms of $X_A$, $Y_A$, $X_B$ and $Y_B$, $$\frac{Z_B}{f} = 1 - \frac{\sqrt{X_B^2 + Y_B^2}}{\sqrt{X_A^2 + Y_A^2}} \quad (2)$$

Accordingly, $Z_B$ may be calculated from the equation:

$$Z_B = f \left[ 1 - \sqrt{\frac{X_B^2 + Y_B^2}{X_A^2 + Y_A^2}} \right] \quad (3)$$

Turning now to FIG. 7, shown therein is an illustration of a 3-D image 62 (shown in phantom lines) constructed from laser points projected onto a real object 64. A set of 3-D image points ($X_B$, $Y_B$, $Z_B$) is determined from laser points projected from all the predetermined laser positions onto the real object 64. Reference numeral 65 designates the plane defined by the positions of the lasers 36 or the array of lasers 36 around the sensor matrix 34 plane.

Each 3-D image point corresponds uniquely to a laser point projected on the surface of the real object 64 from a corresponding one of the laser positions ($X_A$, $Y_A$). This set of image points define a 3-D image 62 of the real object 64. The 3-D image 62 is located between the plane of the sensor matrix 34 of the camera 32 and the vanishing point D of the camera 32. For an actual camera sensor/lens system, the real 3-D image is formed between the lens and the sensor.

Once the three-dimensional image coordinates ($X_B$, $Y_B$, $Z_B$) are known, the three-dimensional coordinates ($X_R$, $Y_R$, $Z_R$) can be constructed by the inverse perspective transformation using a pinhole camera model. The "pinhole" model for a camera is described in U.S. Pat. No. 4,979,815, which is hereby incorporated by reference.

The inverse perspective transformation matrix equation is:

$$[HX_R \; HY_R \; HZ_R \; H] = [X_B \; Y_B \; Z_B \; 1] \begin{bmatrix} 1 & 0 & 0 & 0 \\ 0 & 1 & 0 & 0 \\ 0 & 0 & 1 & -\frac{1}{f} \\ 0 & 0 & 0 & 1 \end{bmatrix} \quad (4)$$

The validity of the inverse perspective transformation may be shown by proving that:

$$Z_B = \frac{fZ_R}{f + Z_R} \quad (5)$$

Referring back to FIG. 6, from triangle DOA:

$$\frac{Z_B}{f} = \frac{AB}{OA} = \frac{OA - OB}{OA} = 1 - \frac{OB}{OA} \quad (6)$$

From triangle CPR:

$$\frac{OB}{f} = \frac{PR}{CP} = \frac{OA}{f + Z_R} \quad (7)$$

which means that:

$$\frac{OB}{OA} = \frac{f}{f + Z_R} \quad (8)$$

Substituting this value for OB/OA into equation (6):

$$\frac{Z_B}{f} = 1 - \frac{f}{f + Z_R} = \frac{Z_R}{f + Z_R} \quad (9)$$

From equation (9):

$$Z_B = \frac{fZ_R}{f + Z_R} \quad (10)$$

Therefore $Z_B$, the image Z-coordinate, may be expressed as a function of f, the focal length of the camera, and $Z_R$, the real object Z-coordinate.

As illustrated by FIGS. 8 and 9, the inner and outer boundaries of the image space are determined by the geometry of the sensor matrix 34, the laser array 65 and the focal length f of the camera 32. A rectangular sensor matrix 34 and a rectangular laser array 65 are shown in FIG. 8. In contrast, a circular sensor matrix 34 and a circular laser array are illustrated by FIG. 9.

Referring to the rectangular construction of FIG. 8, the inner boundary is an inner pyramid 70, which has the sensor matrix 34 as its base. The apex of the inner pyramid 70 is the vanishing point D, which is the point along the optical axis 44 of the camera 32 or Z-axis of the grid system at the focal distance f from the plane of the sensor matrix 34, which coincides with the center of the lens.

The outer boundary of the image space is a parallelopiped 72 and outer pyramid 74 combination. One end of the parallelopiped is the sensor matrix 34R and the opposite end of the parallelopiped 72 is the base of the outer pyramid 74. As indicated by dashed lines 76, the edges of the outer pyramid 74 are defined by straight lines from the corners of the laser array 65R to the vanishing point D.

With reference to the circular arrangement in FIG. 9, the inner boundary of the image space is an inner cone 80 having the circular sensor matrix 34C as its base. The vanishing point D is the apex of the inner cone 80.

The outer boundary of the image space is a cylinder 82 and outer cone 84 combination. One end of the cylinder 82 is the sensor matrix 34C and the opposite end of the cylinder 82 is the base of the outer cone 84.

As indicated by the dashed line 86, the surface of the outer cone 84 is defined by lines from the circumference of the laser array 65C to the vanishing point D. The apex of the outer cone 84 is the vanishing point D.

No matter what shape the sensor matrix 34 and the laser array 65 have, the image points of an object must be between the inner and outer boundaries of the image space. Accordingly, a calculation may be made to determine whether the image points for an object lie between the inner and outer boundaries of the image space. Any image points which lie outside the image space may be flagged as not valid by the computer system 38.

Figure 10:
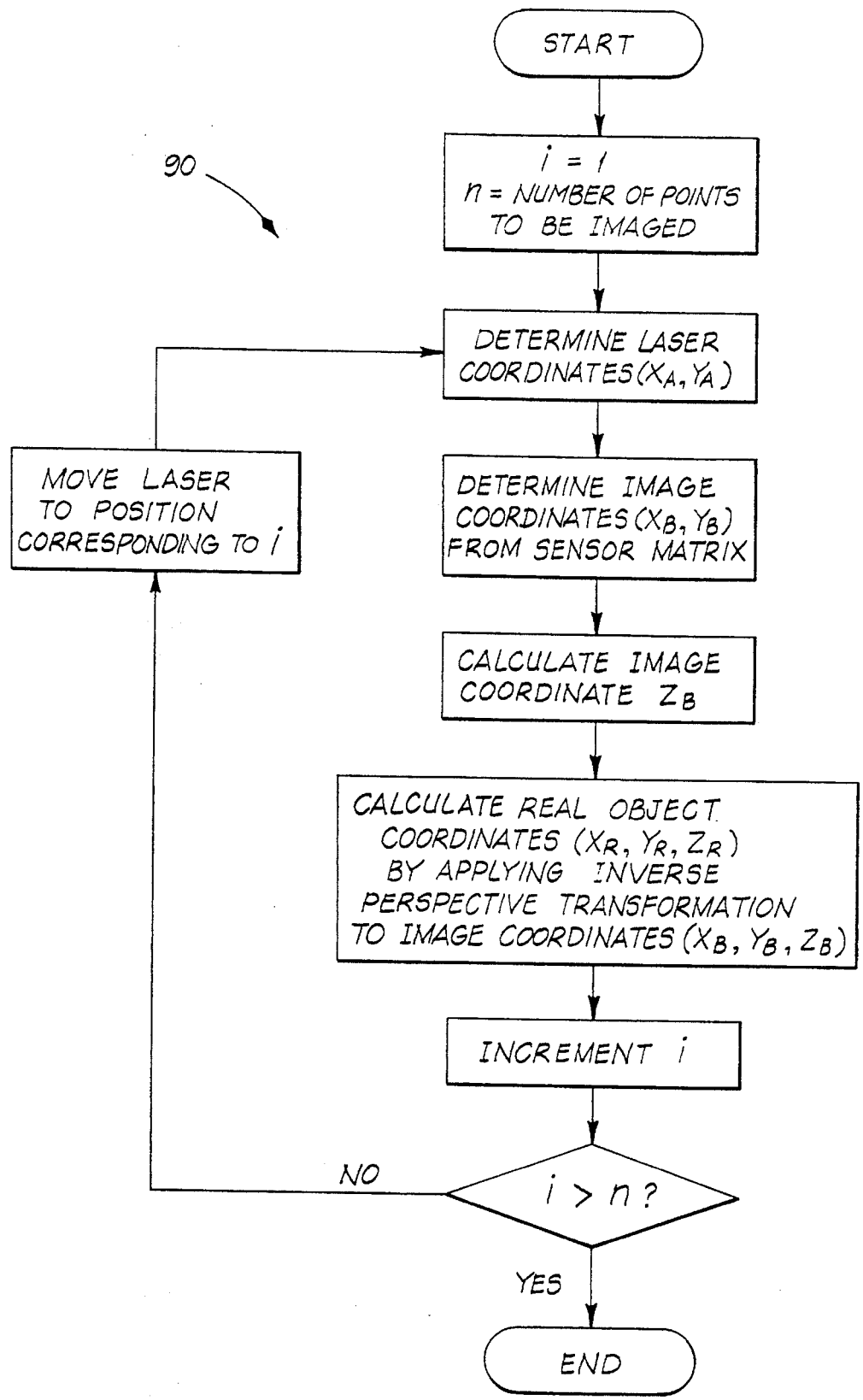
FIG. 10 is a flow diagram illustrating the steps executed by the computer system to construct a 3-D image and 3-D world coordinates of an object.

Referring now to FIG. 10, shown therein and designated by reference numeral 90 is a flow diagram of the steps performed by the apparatus 30, 30A or 30B in imaging an object. These steps have been described hereinabove and are reflected in the computer software listings appended hereto.

Camera Calibration

Camera calibration is required because the image obtained from the camera is not the ideal image. A number of geometric camera parameters may contribute to image distortion, such as camera position, focal length, radial lens distortion, pixel size and optical axis piercing point.

For camera calibration, a notation for camera parameters may be defined as geometric parameters $[t_1, t_2, t_3, \phi, \theta, \psi, f, \kappa, \sigma_u, u_0, v_0]$. These parameters are defined as follows:

$t_1$, $t_2$, $t_3$ are coordinates from the x, y and z axes, respectively, for translation due to the misalignment of the sensor array with the optical axis.

$\phi$, $\theta$, $\psi$ are Euler angles rotating about the x, y and z axes, respectively.

f is the focal length of the camera.

$\kappa$ is the radial lens distortion coefficient.

$\delta$ is the horizontal pixel spacing (millimeters/pixel).

$u_0$, $v_0$ are the two-dimensional coordinates (in pixels) of the center of the image plane.

The rotation and translation components of camera calibration may be expressed as transformation matrices:

$$T = \begin{bmatrix} R & t \\ 0 & 1 \end{bmatrix} = \begin{bmatrix} r_1 & r_2 & r_3 & t_1 \\ r_4 & r_5 & r_6 & t_2 \\ r_7 & r_8 & r_9 & t_3 \\ 0 & 0 & 0 & 1 \end{bmatrix} \quad (11)$$

where t is a translation vector $(t_1, t_2, t_3)$, and

R is a 3×3 rotation matrix determined by the three Euler angle $\phi$, $\theta$, $\psi$ rotating about the x, y and z axes, respectively.

The vertical scaling factor $\delta_v$ is typically known from the technical data for the camera. The horizontal scaling factor $\delta_u$ is obtained from the following equation:

$$\delta_u = \delta'_u \frac{f_{camera}}{f_{digitizer}} \quad (12)$$

where $f_{camera}$ is the pixel scanning rate of the camera, $f_{digitizer}$ is the pixel scanning rate of the digitizer, and $\delta_u'$ is the horizontal pixel spacing of the imager. Typically, $f_{camera}$, $f_{digitizer}$ and $\delta_u'$ are found in the technical specifications for the camera, digitizing and imaging hardware.

With reference to the "Calibration Program" in the appended computer listing, the methodology for camera calibration is now described. The number of calibration points "n", the object coordinates "obj" $(x_j, y_j, z_j$, where j=1 to n), and the image coordinates "image" $(u_j, v_j$, where j=1 to n) are input into the computer program. From these 2-D to 3-D pairs, the matrices A, B and C are constructed as follows:

$$A = \begin{bmatrix} \cdot & \cdot & \cdot & \cdot & \cdot & \cdot & \cdot & \cdot \\ x_j & y_j & z_j & 1 & 0 & 0 & 0 & 0 \\ 0 & 0 & 0 & 0 & x_j & y_j & z_j & 1 \\ \cdot & \cdot & \cdot & \cdot & \cdot & \cdot & \cdot & \cdot \end{bmatrix} \quad (13)$$

$$B = \begin{bmatrix} \cdot & \cdot & \cdot & \cdot \\ -u_j x_j & -u_j y_j & -u_j z_j & -u_j \\ -v_j x_j & -v_j y_j & -v_j z_j & -v_j \\ \cdot & \cdot & \cdot & \cdot \end{bmatrix} \quad (14)$$

Two factors are calculated for use in the construction of another matrix C. These factors are:

$$\sigma_u = (u_j - u_0)\rho_j^2 \quad (15)$$

and $$\sigma_v = (v_j - v_0)\rho_j^2 \quad (16)$$

where $$\rho_j^2 = \delta_u^2 (u_j - u_0)^2 + \delta_v^2 (v_j - v_0)^2 \quad (17)$$

Matrix C is then constructed according to the equation:

$$C = \begin{bmatrix} \cdot & \cdot & \cdot & \cdot \\ \sigma_u x_j & \sigma_u y_j & \sigma_u z_j & \sigma_u \\ \sigma_v x_j & \sigma_v y_j & \sigma_v z_j & \sigma_v \\ \cdot & \cdot & \cdot & \cdot \end{bmatrix} \quad (18)$$

Next, the inverse of matrix A is calculated. The inverse of matrix A is useful in constructing three more matrices R, S and T, according to the equations:

$$R = B^t B - B^t A (A^t A)^{-1} A^t B \quad (19)$$

$$S = C^t B - C^t A (A^t A)^{-1} + B^t A^{-1} A^t C \quad (20)$$

$$T = C^t C - C^t A (A^t A)^{-1} A^t C \quad (21)$$

Having calculated the matrices R, S and T, the matrix K is constructed:

$$K = \begin{bmatrix} 0 & 1 \\ -T^{-1}R & -T^{-1}S \end{bmatrix} \quad (22)$$

The matrix K corresponds to the radial distortion of the lens, $\kappa$. Thus the eigenvalues of the matrix K are determined in order to find $\kappa$. The real part of the eigenvalue of the matrix K which has the smallest imaginary part is selected as the radial lens distortion parameter $\kappa$.

With $\kappa$, R, S, and T now known, the matrix D is constructed according to the equation:

$$D = [\kappa^2 T + \kappa S + R] \quad (23)$$

The eigenvalues of the matrix D are calculated and the real part of the eigenvalue with the smallest imaginary part is selected as the eigenvector q.

The eigenvector q is used to construct the matrix P, as follows:

$$P = -[(A^t A)^{-1} A^t B + \kappa (A^t A)^{-1} A^t C] q \quad (24)$$

The rotation parameters $r_7$, $r_8$, $r_3$ and the translation parameter $t_3$ are recovered from the eigenvector q. The rotation parameters $r_1$ through $r_6$ and the translation parameters $t_1$ and $t_2$ are recovered from the matrix P. The origin of the image plane ($u_0$, $v_0$), which was initially set to (0,0), is also recovered from the matrix P.

At this point, all of the camera calibration parameters ($t_1$, $t_2$, $t_3$, $\phi$, $\theta$, $\psi$, f, $\kappa$, $\delta_u$, $u_0$, $v_0$) are known or have been determined. The values of these parameters are checked for reasonableness before being used to adjust the location of image points.

Embodiment Using a Plane of Light

Rather than project a beam of light, the present invention may direct a plane of laser light on the object to be imaged. A laser source may be caused to project a plane of light by directing the laser beam through a cylindrical lens. This application is well known in the art and is disclosed in U.S. Pat. No. 4,979,815, which has already been incorporated herein by reference. By directing the plane of laser light at the object, a laser stripe is projected on the object.

Figure 11:
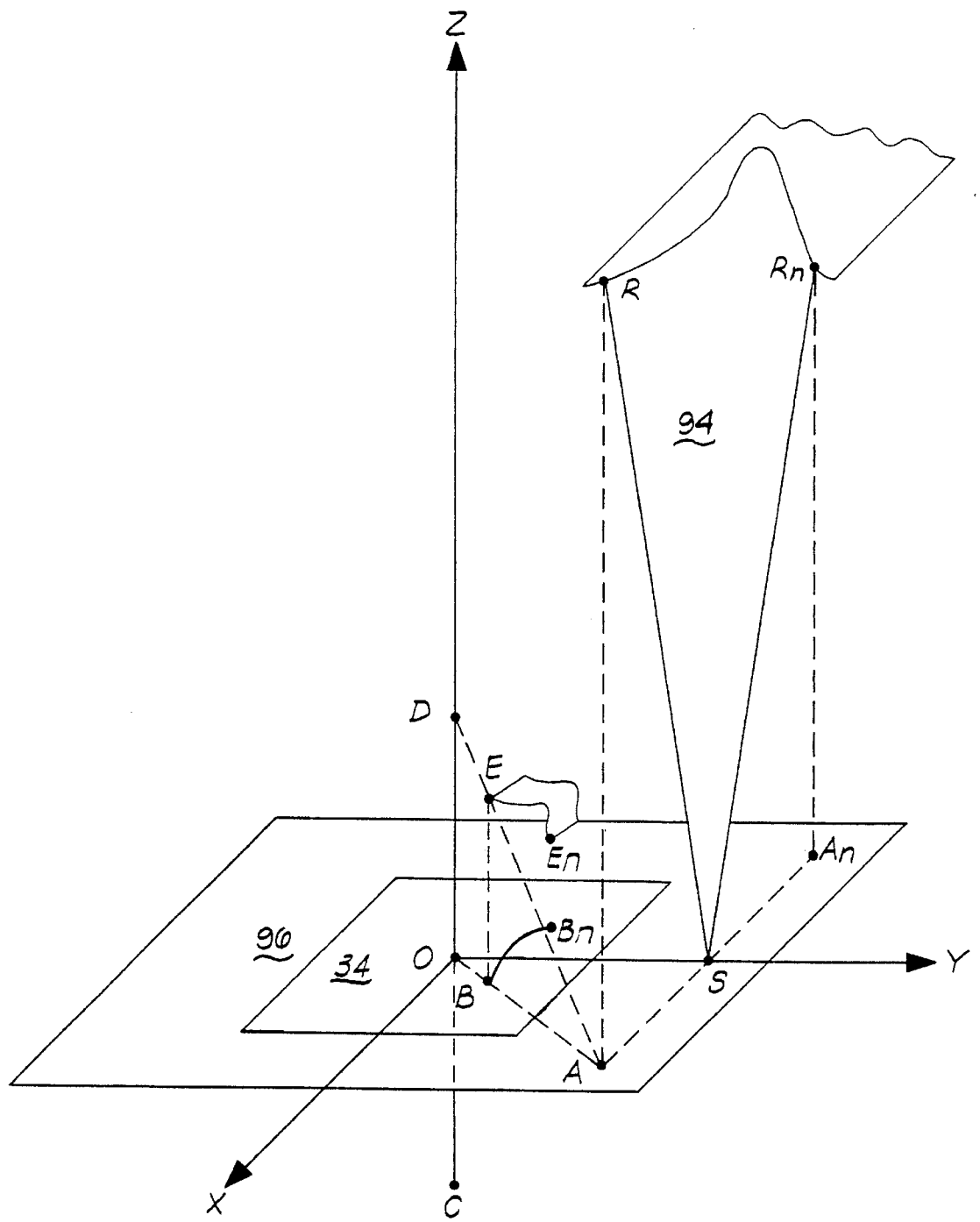
FIG. 11 is a diagram illustrating an alternate embodiment of the present invention which projects a plane of laser light onto an object to be imaged.

With reference to FIG. 11, shown therein is a partly diagrammatical representation of an embodiment of the present invention utilizing a plane of light. The point S indicates the position of a laser source. It should be appreciated that the laser beam is directed through a cylindrical lens or the like to project a plane 94 of laser light onto an object.

The projection of the plane 94 of laser light is effectively the same as the simultaneous projection of laser beams from the points of the line A-$A_n$ in the plane 96 of the sensor matrix 34. The plane 94 of laser light produces a laser stripe R-$R_n$ on the object.

As described hereinabove, the sensor matrix provides a representation in the image plane of the light projected on an object surface. In this case, the sensor matrix produces an image stripe B-$B_n$ in the image plane corresponding to the laser stripe R-$R_n$.

In order to create a three-dimensional image of the object, it is necessary to determine an image stripe E-$E_n$ which corresponds to the laser stripe R-$R_n$. First, for each one of the image points B-$B_n$, a corresponding point on the line A-$A_n$ is computed.

To illustrate this computation, the correlation of point B with point A is now described. The x-y coordinates for point a are ($X_A$, $Y_A$). Similarly, the x-y coordinates for point B are ($X_B$, $Y_B$).

Of these coordinates, $Y_A$ is known from the selected position of the laser source S. Both $X_B$ and $Y_B$ are known because point B is the image point being processed. Thus the x-coordinate of point A can be calculated from the slope of the line OB and $Y_A$. Expressed as an equation, this relationship is:

$$X_A = \left( \frac{X_B}{Y_B} \right) Y_A \quad (25)$$

Point B has x-y-z coordinates ($X_B$, $Y_B$, 0). Thus, point B has the same x-y coordinates ($X_B$, $Y_B$) as point E. Accordingly, all that remains to be found is the z-coordinate of point E, $Z_B$. $Z_B$ is computed as disclosed hereinabove in Equation 3.

Once the image point E ($X_B$, $Y_B$, $Z_B$) is determined, the inverse transformation matrix is applied to point E to calculate the three-dimensional real coordinates ($X_R$, $Y_R$, $Z_R$) of point R on the object surface. The methodology of the inverse transformation matrix has been discussed hereinabove (Equations 4 through 10).

It should be appreciated that these computations are performed for a sufficient number of sensor points B-$B_n$ to construct the three-dimensional image E-$E_n$. Then the laser source S may be moved or rotated to project the plane 94 of laser light onto another portion of the object surface. The computations and movement or rotation of the laser source S are continued until a three-dimensional image of the entire object surface is created.

The plane 94 of laser light may be moved and rotated in any suitable manner as long as the location of the plane 94 of laser light is coordinated with the computer software making computations for the model. However, the plane 94 of laser light must be parallel with the optical axis (z-axis) in order for the computations to be valid.

It should be appreciated that the present invention may be employed in a wide variety of applications. For example, but not by way of limitation, the present invention may be utilized in manufacturing inspection, medical imaging, comparison of dental structures, target-sighting, range-finding, three-dimensional television or three-dimensional video display.

Changes may be made in the combination and arrangement of the various parts, elements, steps and procedures described herein without departing from the spirit and scope of the invention as defined in the appended claims.

Computer Program Listings

```c
/* This program digitizes any number of points and
   writes the image coords to an output file */
#include "itex100/itex100.h"
#include "itex100/stdtyp.h"
#include "gl.h"
#include "device.h"
#include <math.h>
#include <stdio.h>
main()
{int i,j,k,value,thres = 125,thresum,count = 0,num = 0,pts;
 FILE *f1;
 float image[150][4],imgx,imgy,actx,acty,actual[150][4],recon[150][4],im
 act[150][4];
 float nmtr,dntr,imagex[150],imagey[150],f = 16;
 float addimx = 0,addimy = 0;
 char opt;
 char fname[80];
 sethdw(0, 0, 2, 8);
 setdim(1024,1024,12);
 initialize();
 sclear(128);
 setcamera(0);
 extsync();
 printf("\n\nHow many points do you need to read : ");
 scanf("%d",&num);
 printf("Enter the file name : ");
 scanf("%s", fname);
 f1 = fopen(fname,"w");
 for(k=0;k < num;k++)
    {
      grab(-1);
      printf("Enter x & y coords of the point(%d) : ",k+1);
```

```
            scanf("%f %f",&actual[k][0],&actual[k][1]);
            snap(WAIT);
            image[k][0] = 0;
             image[k][1] = 0;
 5          count = 0;
            thresum = 0;
            for(i=0;i<480;i++)
               for(j=0;j<512;j++)
                  {value = rpixel(j,i);
10                  if(value > thres)
                      {count++;
                    thresum += value;
                       imagex[k] += (j*value);
                       imagey[k] += (i*value);}}
15          imagex[k] /= thresum;
            imagey[k] /= thresum;
            fprintf(f1,"%f %f\n",imagex[k],imagey[k]);}
      for(k=0;k < num;k++)
            fprintf(f1,"%f %f\n",actual[k][0],actual[k][1]);
20    fclose(f1);
      for(k=0;k < num;k++)
      for(i = -25;i <= 25;i++)
           {wpixel((int)imagex[k],(int)imagey[k]+i,200);
            wpixel((int)imagex[k]+i,(int)imagey[k],200);}
25    for(i=0;i<512;i++)
           {wpixel(i,10,200);
            wpixel(i,450,200);
            wpixel(15,i,200);
            wpixel(485,i,200);}
30    for(i=250;i<=262;i++)
           {wpixel(i,256,150);
            wpixel(256,i,150);}}
      /* This Program reconstructs the 3D real object coordinates
         by reading the digitized 2D image coordinates from a file */
35    #include<math.h>
```

```
        #include<stdio.h>
        #include<stdlib.h>
        main()
        {int i,j,n;
 5      char fname_in1[25],fname_in2[25],fname_out[25];
        double inv_t[3][3],t1,t2,t3;
        double
        delta_u,delta_v,u0,v0,f,uf[60],vf[60],ufp[60],vfp[60],lu[60],k;
        double ui[60],vi[60];
10      double x[60],y[60],z[60],xc,yc[60],zc[60];
        double a1,a2,b1,b2,c1[60],c2[60];
        FILE *f1,*f2,*f3;
        void inv();
        fprintf(stdout,"Enter Input file name (image coordinates):");
15      fscanf(stdin,"%s",fname_in1);
        if ((f1=fopen(fname_in1, "r")) == NULL )
        { fprintf(stdout,"error reading file %s\n",fname_in1);
          exit(0);}
        /*printf("Input the number of image points:\n");*/
20      fscanf(f1,"%d\n ",&n);
        /*printf("Input the coordinates of each image (pixel):\n");*/
          for(i=0;i<n;i++)
          fscanf(f1,"%lf  %lf\n",&ui[i],&vi[i]);
          printf("%d \n",n);
25        for(i=0;i<n;i++)
          printf("%lf  %lf\n",ui[i],vi[i]);
        fprintf(stdout,"Enter Input file name (calibration parameters):");
        fscanf(stdin,"%s",fname_in2);
        if ((f2=fopen(fname_in2, "r")) == NULL )
30      { fprintf(stdout,"error reading file %s\n",fname_in2);
          exit(0);}
        /** Input the calibration parameters **/
        for(i=0;i<3;i++)
           { for(j=0;j<3;j++)
35            {fscanf(f2,"%lf ",&inv_t[i][j]);}}
```

```
        fscanf(f2,"%lf %lf %lf \n",&t1,&t2,&t3);
        fscanf(f2,"%lf %lf \n",&delta_u,&delta_v);
        fscanf(f2,"%lf %lf \n",&u0,&v0);
        fscanf(f2,"%lf %lf \n",&f,&k);
 5      printf("\n*********************************************\n");
        for(i=0;i<3;i++)
           {  for(j=0;j<3;j++)
              {printf("%lf ",inv_t[i][j]);}
               printf("\n");}
10      printf("%lf %lf %lf \n",t1,t2,t3);
        printf("%lf %lf \n",delta_u,delta_v);
        printf("%lf %lf \n",u0,v0);
        printf("%lf %lf \n",f,k);
        /***Input the Xc(the distance between the laser and the center of
15      camera*/
        xc= 80.;
        /*************************************************************
        *********/
        for(i=0;i<n;i++)
20      { ufp[i]=(ui[i]-u0)*delta_u;
          vfp[i]=(vi[i]-v0)*delta_v;
          lu[i]=sqrt(ufp[i]*ufp[i]+vfp[i]*vfp[i]);
          uf[i]=(1-k*lu[i]*lu[i])*ufp[i];
          vf[i]=(1-k*lu[i]*lu[i])*vfp[i];}
25      for(i=0;i<n;i++)
        { zc[i]=f*xc/uf[i];
          yc[i]=vf[i]*zc[i]/f;}
            for(i=0;i<n;i++)
        {x[i]=inv_t[0][0]*(xc-t1)+inv_t[0][1]*(yc[i]-t2)+inv_t[0][2]*(zc[
30      i]-t3);
        y[i]=inv_t[1][0]*(xc-t1)+inv_t[1][1]*(yc[i]-t2)+inv_t[1][2]*(zc[i
        ]-t3);
        z[i]=inv_t[2][0]*(xc-t1)+inv_t[2][1]*(yc[i]-t2)+inv_t[2][2]*(zc[i
        ]-t3);}
35      printf("\n The reconstructed coordinates :\n");
```

```
    for(i=0;i<n;i++)
    { printf("%lf   %lf   %lf \n",x[i],y[i],z[i]);}
/***** Put the result in a file *****/
printf("Enter the output file name :");
fscanf(stdin,"%s",fname_out);
f3 = fopen(fname_out,"w");
    fprintf(f3,"\n The reconstructed coordinates :\n");
    for(i=0;i<n;i++)
    { fprintf(f3,"%lf   %lf   %lf \n",x[i],y[i],z[i]);}
fclose(f3);}
/***** Calibration Program *****/
#include<math.h>
#include<stdio.h>
#include<stdlib.h>
main()
{int n,i,k,nn,j,n_real_eig,l,m,jj;
int tt1,tt2,tt3,tt4,tt5,tt6,tt7,tt8,tt9,tt10,tt11,tt12;
char fname_out[25], fname_in[25];
double real[8],real_eig[8],imagi[8],inver_mat[400][400],
    a_gauss[8][8],D_real[8],D_imagi[8],D_real_eig[8];
double  obj[400][4],image[400][2],A[400][8],B[400][8],
    C[400][8],S[8][8],R[8][8],T[8][8],K[8][8],lu[400];
double  T_inv[8][400],T_inv_R[8][8],T_inv_S[8][8];
double  S1[8][8],S2[8][8],SS2[8][8],SSS2[8][8],SSSS2[8][8],
    S3[8][8],S4[8][8],SS4[8][8],SSS4[8][8],SSSS4[8][8],
    R1[8][8],R2[8][8],RR2[8][8],RRR2[8][8],RRRR2[8][8],
    T1[8][8],T2[8][8],TT2[8][8],TTT2[8][8],TTTT2[8][8];
double  At[8][400],Bt[8][400],Ct[8][400],AtA[8][8],inv_AtA[8][400],
    BtB[8][8],CtC[8][8],D[8][8],trans[8][8],inv_t[8][400];
double  r1,r2,r3,r4,r5,r6,r7,r8,r9,t1,t2,t3,cof,f;
double norm_p3,q_vec[8],p_vec[8],P[8][8],opt_u0,opt_v0;
double  k_min_eig,lamda,delta_u,u0,v0,temp1,temp2,temp3,temp4,
    temp5,temp6;
double f_cam=14.3,f_dig=12.5,delta_up=0.012,delta_v=0.0137;
double test1,test2,test3,test4,test5,test6,test7,test8,test9;
```

```
           double test10,test11,test12;
           double alph1,alph2,alph3,s1,c1,s2,c2,s3,c3;
           FILE *f1,*f2;
           void eig(),inv(),gauss(),transpose(),multi();
 5         fprintf(stdout,"Enter Input file name: ");
           fscanf(stdin,"%s", fname_in);
           if((f2=fopen(fname_in, "r")) == NULL) {
                fprintf(stdout,"error reading file %s\n", fname_in);
                exit(0);}
10         /* printf("Input the Number of the calibration points:"); */
           fscanf(f2,"%d",&n);
           /*printf("\nInput the object coordinates matrix:\n");*/
           for(i=0;i<n;i++){
               for(j=0;j<4;j++) {
15                 fscanf(f2, "%lf\n ", &obj[i][j]);}}
           /*n=6;  */         /* order of matrix */
           /*printf("\nInput the image coordinates matrix:\n");*/
           for(i=0;i<n;i++){
               for(j=0;j<2;j++) {fscanf(f2,"%lf\n ", &image[i][j]);}}
20         /***** 1. Construct the matrix A (2nx8) *****/
           for(i=0;i<n;i++)
           { for(j=0;j<4;j++)
             { A[i][j]=obj[i][j];}}
           for(i=0;i<n;i++)
25         {  for(j=4;j<8;j++)
              {A[i][j]=0.0;}}
           for(i=n;i<(2*n);i++)
           {  for(j=0;j<4;j++)
              { A[i][j]=0.0;}}
30          for(i=n;i<(2*n);i++)
           {  for(j=4;j<8;j++)
              { A[i][j]=obj[i-n][j-4];}}
           /***** Finish construct matrix A *****/
           /*printf("\n Matrix A :\n");
35         for(i=0;i<(2*n);i++)
```

```
        {   for(j=0;j<8;j++)
            { printf("%lf ",A[i][j]);}
            printf("\n");}*/
        /***** 2. Construct the Matrix B(2nx4) *****/
 5      for(i=0;i<n;i++)
        { for(j=0;j<4;j++)
            { B[i][j]= -obj[i][j]*image[i][0];}}
        for(i=n;i<(2*n);i++).
        { for(j=0;j<4;j++)
10          { B[i][j]= -obj[i-n][j]*image[i-n][1];}}
        /***** Finish the construct of matrix B *****/
        /*printf("\n Matrix B :\n");
        for(i=0;i<(2*n);i++)
        {   for(j=0;j<4;j++)
15          { printf("%lf ",B[i][j]);}
            printf("\n");}*/
        /***** 3. Initialize   (u0,v0)=0.0 *****/
          u0=0.0;    v0=0.0;
          delta_u=delta_up*f_cam/f_dig;
20      for(i=0;i<n;i++)
          { lu[i]=sqrt(delta_u*delta_u*image[i][0]*image[i][0]+
                    delta_v*delta_v*image[i][1]*image[i][1]);}
        /***** 4. Calculate the matrix of C *****/
        for(i=0;i<n;i++)
25      {   for(j=0;j<4;j++)
            { C[i][j]=image[i][0]*lu[i]*lu[i]*obj[i][j];}}
        for(i=n;i<(2*n);i++)
        {   for(j=0;j<4;j++)
            { C[i][j]=image[i-n][1]*lu[i-n]*lu[i-n]*obj[i-n][j];}}
30      /**** Finish construct the matrix of C ***/
        /*printf("\n Matrix C :\n");
        for(i=0;i<(2*n);i++)
        {   for(j=0;j<4;j++)
            { printf("%lf   ",C[i][j]);}
35          printf("\n");}*/
```

```
/***** 5. Calculate the inverse of (At*A) *****/
   transpose(2*n,8,A,At);
   multi(8,2*n,At,8,A,AtA);
      printf("\n----------------------------------------\n");
      printf("\n Matrix AtA :\n");
      for(i=0;i<8;i++)
      {   for(j=0;j<8;j++)
          { printf("%lf ",AtA[i][j]);}
          printf("\n");}
   inv(8,AtA,inv_AtA);
      printf("\n----------------------------------------\n");
      printf("\n Matrix inv_AtA :\n");
      for(i=0;i<8;i++)
      {   for(j=0;j<8;j++)
          { printf("%lf ",inv_AtA[i][j]);}
          printf("\n");}
/***** 6. Calculate S,R,T matrices *****/
   /* S */
      transpose(2*n,4,C,Ct);
      multi(4,2*n,Ct,4,B,S1);
      multi(8,2*n,At,4,B,S2);
      multi(8,8,inv_AtA,4,S2,SS2);
      multi(4,2*n,Ct,8,A,SSS2);
      /* Don't use subroutine for saving space */
      for(i=0;i<4;i++)
      {   for(j=0;j<4;j++)
          { SSSS2[i][j]=0;}}
      for(i=0;i<4;i++)
      {   for(j=0;j<4;j++)
          { for(k=0;k<8;k++)
              { SSSS2[i][j]=SSSS2[i][j]+SSS2[i][k]*SS2[k][j];}}}
      transpose(2*n,4,B,Bt);
      multi(4,2*n,Bt,4,C,S3);
      multi(8,2*n,At,4,C,S4);
      multi(8,8,inv_AtA,4,S4,SS4);
```

```
        multi(4,2*n,Bt,8,A,SSS4);
        for(i=0;i<4;i++)
        {   for(j=0;j<4;j++)
            { SSSS4[i][j]=0;}}
        for(i=0;i<4;i++)
        {   for(j=0;j<4;j++)
            { for(k=0;k<8;k++)
                { SSSS4[i][j]=SSSS4[i][j]+SSS4[i][k]*SS4[k][j];}}}
        for(i=0;i<4;i++)
        {   for(j=0;j<4;j++)
            { S[i][j]=S1[i][j]-SSSS2[i][j]+S3[i][j]-SSSS4[i][j];}}
        printf("\n----------------------------------------\n");
        printf("\n Matrix S :\n");
        for(i=0;i<4;i++)
        {   for(j=0;j<4;j++)
            { printf("%lf   ",S[i][j]);}
            printf("\n");}
    /* R */
        multi(4,2*n,Bt,4,B,R1);
        multi(8,2*n,At,4,B,R2);
        multi(8,8,inv_AtA,4,R2,RR2);
        multi(4,2*n,Bt,8,A,RRR2);
        for(i=0;i<4;i++)
        {   for(j=0;j<4;j++)
            { RRRR2[i][j]=0;}}
        for(i=0;i<4;i++)
        {   for(j=0;j<4;j++)
            { for(k=0;k<8;k++)
                {RRRR2[i][j]=RRRR2[i][j]+RRR2[i][k]*RR2[k][j];}}}
        for(i=0;i<4;i++)
        {   for(j=0;j<4;j++)
            { R[i][j]=R1[i][j]-RRRR2[i][j]; }}
        printf("\n----------------------------------------\n");
        printf("\n Matrix R :\n");
        for(i=0;i<4;i++)
```

```
         { for(j=0;j<4;j++)
            { printf("%lf   ",R[i][j]);}
           printf("\n");}
      /* T */
5       multi(4,2*n,Ct,4,C,T1);
        multi(8,2*n,At,4,C,T2);
        multi(8,8,inv_AtA,4,T2,TT2);
        multi(4,2*n,Ct,8,A,TTT2);
          for(i=0;i<4;i++)
10        {   for(j=0;j<4;j++)
              { TTTT2[i][j]=0;}}
          for(i=0;i<4;i++)
          {  for(j=0;j<4;j++)
              { for(k=0;k<8;k++)
15              { TTTT2[i][j]=TTTT2[i][j]+TTT2[i][k]*TT2[k][j];}}}
          for(i=0;i<4;i++)
          {  for(j=0;j<4;j++)
              { T[i][j]=T1[i][j]-TTTT2[i][j]; }}
           printf("\n-------------------------------------------\n");
20         printf("\n Matrix T :\n");
           for(i=0;i<4;i++)
           {   for(j=0;j<4;j++)
              { printf("%lf   ",T[i][j]);}
             printf("\n");}
25    /***** 7. Calculate the matrix of K *****/
              inv(4,T,T_inv);
               printf( "\nThe inversion of the T matrix: \n");
               printf("-------------------------------------------\n");
              for(i=0; i<4;i++)
30              { for(j=0;j<4;j++)
                    {printf(  "%lf ",T_inv[i][j]);}
                      printf("\n");}
                printf("-------------------------------------------\n");
         multi(4,4,T_inv,4,R,T_inv_R);
35       multi(4,4,T_inv,4,S,T_inv_S);
```

```
        for(i=0;i<4;i++)
        {  for(j=0;j<8;j++)
           { K[i][j]=0.0;}}
        for(i=0;i<4;i++)
5          {K[i][i+4]=1.0;}
        for(i=4;i<8;i++)
        {  for(j=0;j<4;j++)
           {K[i][j]= -T_inv_R[i-4][j];}}
        for(i=4;i<8;i++)
10      {  for(j=4;j<8;j++)
           {K[i][j]= -T_inv_S[i-4][j-4];}}
        /***** The End of matrix K *****/
         printf( "\nThe  matrix of K: \n");
         printf("----------------------------------------\n");
15      for(i=0; i<8;i++)
           { for(j=0;j<8;j++)
               {printf(  "%lf ",K[i][j]);}
                printf("\n");}
        /***** 8. Calculate the eigenvalue of matrix K *****/
20          eig(8,K,real,imagi);
             printf( "\nEigenvalues: \n");
             printf("----------------------------------------\n");
             printf("  Real part          Imaginary part \n");
             printf("----------------------------------------\n");
25           for(i=1; i<=8;i++)
                printf( "%lf       %lf \n",real[i],imagi[i]);
        /***** Select eigenvalue with the smallest imaginary part *****/
            /* choose the real eigenvalue */
            n_real_eig=0;
30          for(i=1;i<=8;i++)
            {  if(imagi[i]==0)
                { real_eig[n_real_eig]=real[i];
                  n_real_eig=n_real_eig+1;}}
            /* compare the eigenvalue */
35          k_min_eig=fabs(real_eig[0]);
```

```
         for(j=0;j<n_real_eig;j++)
          {  if(k_min_eig>fabs(real_eig[j]))
             { k_min_eig=fabs(real_eig[j]);
               jj=j;}}
       k_min_eig=fabs(real[1]);
         for(j=1;j<=8;j++)
          {  if(k_min_eig>fabs(real[j]))
             { k_min_eig=fabs(real[j]);
               jj=j;}}
       if(jj==0)
       {jj=1;}
       k_min_eig=real[jj];
     /**** input the k_min_eig from matlab ****/
      /*  k_min_eig= 0.0000579; */
       printf("---------------------------------\n");
       printf( "\nNumber of real Eigenvalue: %d ",n_real_eig);
       printf( "\nMinimum Eigenvalue: %lf ",k_min_eig);
       printf("\n---------------------------------\n");
     /**** 9. Calculate Matrix of D=k^2*T+k*S+R ****/
         for(i=0;i<4;i++)
             {          f o r ( j = 0 ; j < 4 ; j + + )
     {D[i][j]=k_min_eig*k_min_eig*T[i][j]+k_min_eig*S[i][j]+R[i][j];}}
           printf( "\nThe D matrix: \n");
           printf("---------------------------------\n");
         for(i=0;  i<4;i++)
            { for(j=0;j<4;j++)
                {printf(  "%lf ",D[i][j]);}
                printf("\n");}
           printf("---------------------------------\n");
     /***** 10. Calculate the eigenvalue of Matrix D *****/
           eig(4,D,D_real,D_imagi);
           printf( "\nEigenvalues: \n");
           printf("---------------------------------\n");
           printf("  Real part         Imaginary part \n");
           printf("---------------------------------\n");
```

```
              for(i=1; i<=4;i++)
                  printf( "%lf      %lf  \n",D_real[i],D_imagi[i]);
      /***** Select eigenvalue with the smallest imaginary part *****/
      /* choose the real eigenvalue */
      n_real_eig=0;
      for(i=1;i<=4;i++)
      {   if(D_imagi[i]==0)
          { D_real_eig[n_real_eig]=D_real[i];
            n_real_eig=n_real_eig+1;}}
      /* compare the eigenvalue */
      lamda=fabs(D_real_eig[0]);
      for(j=0;j<n_real_eig;j++)
      {   if(lamda>fabs(D_real_eig[j]))
          { lamda=fabs(D_real_eig[j]);
            jj=j;}}
      lamda=D_real_eig[jj];
      /** Input the minimum eigenvalue from MATLAB **/
       /*    lamda= 331.65263; */
      /*** Construct the Vector matrix */
      q_vec[0]= -1.0;
      for(i=0;i<4;i++)
      {   D[i][i]=D[i][i]-lamda; }
      for(i=0;i<3;i++)
      { a_gauss[i][3]= D[i][0];}
      for(i=0;i<3;i++)
      {   for(j=0;j<3;j++)
          { a_gauss[i][j]=D[i][j+1];}}
                  printf("-------------------------------------\n");
                  printf( "\nNumber of real Eigenvalue: %d ",n_real_eig);
                  printf( "\nMinimum Eigenvalue: %lf ",lamda);
                  printf("\n-------------------------------------\n");
                  printf( "\n The Matrix of a_gauss.  \n");
                  for(i=0; i<3;i++)
                  {   for(j=0;j<4;j++)
                      { printf("%lf  ",a_gauss[i][j]);}
```

```
                  printf("\n");}
        gauss(3,a_gauss,q_vec);
               printf("----------------------------------------\n");
               printf( "\n The Vector of q.  \n");
5                  printf("\n%lf  ",q_vec[0]);
           for(j=1;j<=3;j++)
                 { printf("\n%lf  ",q_vec[j]);}
     /***** Recover the parameter (r7,r8,r9,t3) from the vector q *****/
     norm_p3=sqrt(1/(q_vec[0]*q_vec[0]+q_vec[1]*q_vec[1]+q_vec[2]*q_ve
10   c[2]));
           r7=norm_p3*q_vec[0];
           r8=norm_p3*q_vec[1];
           r9=norm_p3*q_vec[2];
           t3=norm_p3*q_vec[3];
15   /***** Calculate the matrix of P *****/
           for(i=0;i<8;i++)
           {   for(j=0;j<4;j++)
                { P[i][j]=SS2[i][j]+k_min_eig*SS4[i][j];}}
           for(i=0;i<8;i++)
20         { p_vec[i]=0.0;}
           for(i=0;i<8;i++)
           {  for(j=0;j<4;j++)
                {  p_vec[i]= p_vec[i]+P[i][j]*q_vec[j]; }}
           for(i=0;i<8;i++)
25         {  for(j=0;j<4;j++)
                {  p_vec[i]= -p_vec[i]; }}
               printf("\n*******************************************\n");
               printf( "\n The Vector p  \n");
               printf("\n*******************************************\n");
30             for(i=0;i<8;i++)
                 { printf("%lf   ",p_vec[i]);}
     /***** Calculate the Rotation matrix *****/
           opt_v0=norm_p3*(p_vec[4]*r7+p_vec[5]*r8+p_vec[6]*r9);
           opt_u0=norm_p3*(p_vec[0]*r7+p_vec[1]*r8+p_vec[2]*r9);
35         temp1=norm_p3*p_vec[0]-r7*opt_u0;
```

```
        alph1= -atan((norm_p3*p_vec[1]-r8*opt_u0)/temp1);
        if (temp1==0.0)
        {alph1=90.0*3.14159/180.0;}
        s1=sin(alph1);
 5      c1=cos(alph1);
        s3=r7*s1+r8*c1;
        c3=sqrt(1-s3*s3);
        alph3=atan(s3/c3);
        if (c3==0.0)
10      { alph3=90.0*3.14159/180.0; }
        c2=r9/c3;
        s2=sqrt(1-c2*c2);
        alph2=atan(s2/c2);
        if (c2==0.0)
15      { alph2=90.0*3.14159/180.0; }
        temp2=p_vec[0]*c1-p_vec[1]*s1;
        if (c3==0.0)
        {alph2=atan(p_vec[2]/temp2);
        if(temp2==0.0)
20      {alph2=90.0*3.14159/180.0;}
        c2=cos(alph2);
        s2=sin(alph2);}
        r1=c1*c2;
        r2= -s1*c2;
25      r3=s2;
        r4=s1*c3+c1*s2*s3;
        r5=c1*c3-s1*s2*s3;
        r6= -c2*s3;
        /********* Test the transformation matrix correctness ****/
30      test1=r1*r1+r2*r2+r3*r3;
        test2=r4*r4+r5*r5+r6*r6;
        test3=r7*r7+r8*r8+r9*r9;
        test4=r1*r1+r4*r4+r7*r7;
        test5=r2*r2+r5*r5+r8*r8;
35      test6=r3*r3+r6*r6+r9*r9;
```

```
test7=r1*r4+r2*r5+r3*r6;
test8=r1*r7+r2*r8+r3*r9;
test9=r4*r7+r5*r8+r6*r9;
test10=r1*r2+r4*r5+r7*r8;
test11=r1*r3+r4*r6+r7*r9;
test12=r2*r3+r5*r6+r8*r9;
tt1= (int)(fabs(test1)+0.001);
tt2= (int)(fabs(test2)+0.001);
tt3= (int)(fabs(test3)+0.001);
tt4= (int)(fabs(test4)+0.001);
tt5= (int)(fabs(test5)+0.001);
tt6= (int)(fabs(test6)+0.001);
tt7= (int)(fabs(test7)+0.999);
tt8= (int)(fabs(test8)+0.999);
tt9= (int)(fabs(test9)+0.999);
tt10= (int)(fabs(test10)+0.999);
tt11= (int)(fabs(test11)+0.999);
tt12= (int)(fabs(test12)+0.999);
if(tt1!=1 || tt2!=1 || tt3!=1 || tt4!=1 ||
   tt5!=1 || tt6!=1 || tt7!=0 || tt8!=0 ||
   tt9!=0 || tt10!=0 || tt11!=0 || tt12!=0)
{ c3= -sqrt(1-s3*s3);
alph3= atan(s3/c3);
if (c3==0.0)
{ alph3=90.0*3.14159/180.0; }
c2=r9/c3;
s2=sqrt(1-c2*c2);
alph2=atan(s2);
if (c2==0.0)
{ alph2=90.0*3.14159/180.0; }
temp2=p_vec[0]*c1-p_vec[1]*s1;
if (c3==0.0)
{alph2=atan(p_vec[2]/temp2);
if(temp2==0.0)
{alph2=90.0*3.14159/180.0;}
```

```
            c2=cos(alph2);
            s2=sin(alph2);}
        r1=c1*c2;
        r2= -s1*c2;
 5      r3=s2;
        r4=s1*c3+c1*s2*s3;
        r5=c1*c3-s1*s2*s3;
        r6= -c2*s3;}
        alph1=alph1*180./3.14159;
10      alph2=alph2*180./3.14159;
        alph3=alph3*180./3.14159;
            printf("\n*******************************************\n");
            printf( "\n The Rotation of angles:  \n");
            printf("\n*******************************************\n");
15          printf("\n%lf    %lf    %lf    ",alph1,alph2,alph3);
        f=norm_p3*(p_vec[4]*r4+p_vec[5]*r5+p_vec[6]*r6)*delta_v;
        t2=(norm_p3*p_vec[7]-t3*opt_v0)*delta_v/f;
        delta_u=f/((p_vec[0]*r1+p_vec[1]*r2+p_vec[2]*r3)*norm_p3);
        t1=(norm_p3*p_vec[3]-t3*opt_u0)*delta_u/f;
20  /***** Print the Transformation matrix *****/
            printf("\n*******************************************\n");
            printf( "\n The Transformation matrix  \n");
            printf("\n*******************************************\n");
                printf("\n%lf    %lf    %lf    %lf    ",r1,r2,r3,t1);
25              printf("\n%lf    %lf    %lf    %lf    ",r4,r5,r6,t2);
                printf("\n%lf    %lf    %lf    %lf    ",r7,r8,r9,t3);
            printf("\n*******************************************\n");
            printf("\n");
            printf("\n*****************************************");
30          printf("\n Delta_u    Delta_v    f\n");
            printf("*******************************************\n");
            printf("\n%lf    %lf    %lf    \n",delta_u,delta_v,f);
            printf("\n");
            printf("\n*******************************************\n");
35          printf("\n The center of sensor (u0,v0) \n");
```

```
        printf("\n%lf     %lf \n",opt_u0,opt_v0);
/***** Test the transformation matrix correctness *****/
test1=r1*r1+r2*r2+r3*r3;
test2=r4*r4+r5*r5+r6*r6;
test3=r7*r7+r8*r8+r9*r9;
test4=r1*r1+r4*r4+r7*r7;
test5=r2*r2+r5*r5+r8*r8;
test6=r3*r3+r6*r6+r9*r9;
test7=r1*r4+r2*r5+r3*r6;
test8=r1*r7+r2*r8+r3*r9;
test9=r4*r7+r5*r8+r6*r9;
test10=r1*r2+r4*r5+r7*r8;
test11=r1*r3+r4*r6+r7*r9;
test12=r2*r3+r5*r6+r8*r9;
        printf("\n*******************************************\n");
        printf("\n The Test of transformation matrix   \n");
        printf("\n    Test1:   %lf    Test2:   %lf     Test3:  %lf\n",test1,test2,test3);
        printf("\n    Test4:   %lf    Test5:   %lf     Test6:  %lf\n",test4,test5,test6);
        printf("\n    Test7:   %lf    Test8:   %lf     Test9:  %lf\n",test7,test8,test9);
        printf("\n    Test10:  %lf    Test11:  %lf     Test12: %lf\n",test10,
  test11,test12);
/* The End of calibration */
/* Calculate the inversion of rotation matrix */
        trans[0][0]=r1;
        trans[0][1]=r2;
        trans[0][2]=r3;
        trans[1][0]=r4;
        trans[1][1]=r5;
        trans[1][2]=r6;
        trans[2][0]=r7;
        trans[2][1]=r8;
```

```
            trans[2][2]=r9;
            inv(3,trans,inv_t);
            printf(" The inversion of rotation matrix: \n");
            printf("\n******************************************\n");
     5      for(i=0;i<3;i++)
            {   for(j=0;j<3;j++)
                {  printf("%lf  ",inv_t[i][j]);}
              printf("\n");}
         printf("\n**************** The   End ******************\n");
    10   /***** Put the result in a file *****/
          printf("Enter the output file name :");
          fscanf(stdin,"%s",fname_out);
        /*  fprintf(stdout, "%s\n", fname_out);*/
          f1 = fopen(fname_out,"w");
    15      for(i=0;i<3;i++)
            {   for(j=0;j<3;j++)
                {  fprintf(f1,"%lf  ",inv_t[i][j]);}
              fprintf(f1,"\n");}
                fprintf(f1,"%lf     %lf    %lf \n ",t1,t2,t3);
    20          fprintf(f1,"%lf      %lf   \n",delta_u,delta_v);
                fprintf(f1,"%lf      %lf   \n",opt_u0,opt_v0);
                fprintf(f1,"%lf      %lf   \n",f,k_min_eig);
          fclose(f1);}
        /***** Next is the subroutine for the inversion of matrix *****/
    25  void inv(n,a_ini,inver)
        double a_ini[][8],inver[][400];
        int n;
        {/* MATRIX INVERSION BY GAUSS-JORDAN(AUGMENTED MATRIX)METHOD. */
        int m,i,j,l,k;
    30  double a[8][16],eps,delt,div;
          eps=1.e-6;
        for(i=0;i<n;i++) {
           for(j=0;j<n;j++) {
               a[i][j]=a_ini[i][j];}}
    35  /* printf("Input the order of square matrix :");
```

```
      scanf("%d",&n);
      printf("Enter the Original Matrix :\n");
      for(i=0;i<n;i++)
      {  for(j=0;j<n;j++)
 5      {    scanf("%lf\n",&a[i][j]);}}*/
      /* for(i=0;i<n;i++)
      {  for(j=0;j<n;j++)
        { printf("%lf    ",a[i][j]);}
          printf("\n");}*/
10    l=n+1;
      m=2*n;
      for(i=0;i<n;i++)
      {  for(j=l-1;j<m;j++)
        {    a[i][j]=0;
15      if(i+n-j==0)
          { a[i][j]=1.;}}}
      for(i=0;i<n;i++)
      { if (i+1-n!=0)
          {     if(fabs(a[i][i])-eps<=0)
20          {            for(k=1;k<n;k++)
              {           for(j=0;j<m;j++)
                {a[i][j]=a[i][j]+a[k][j];}}}}
          div=a[i][i];
        for(j=0;j<m;j++)
25      {   a[i][j]=a[i][j]/div;}
        for(k=0;k<n;k++)
        { delt=a[k][i];
         if(fabs(delt)-eps>0)
          {      if(k-i!=0)
30          {  for(j=0;j<m;j++)
              { a[k][j]=a[k][j]-a[i][j]*delt;}}}}
      /*if(fabs(a[i][j])-eps<=0)
      {printf("The pivot element is zero, the matrix is wrong\n");}*/}
      /* printf("\n The inverse matrix of original:\n");
35    for(i=0;i<n;i++)
```

```
      {  for(j=l-1;j<m;j++)
         {       printf("%lf   ",a[i][j]);}
           printf("\n");}*/
        for(i=0;i<n;i++)
5         {  for(j=0;j<n;j++)
             {   inver[i][j]=a[i][j+l-1];}}
          return;}
    /***** Next is the subroutine for eigenvalue of matrix *****/
    void eig(n,a_ini,rl,im)
10  double a_ini[][8],rl[8],im[8];
    int n;
    {/* Householder QR iteration */
    /*    n: order of matrix
          a[i][j]:matrix elements
15        s: s
          uau :(transpose of u)A(u)
          rl(k): real part of k-th eigenvalue
          im(k): imaginary part of k-th eigenvalue
          it: iteration number        */
20  char g[8][11];
    int i,ir,it,j,k,l,m,na,nn,_i,_r;
    double b23,dummy,f[11],h,hh,ma,p,q,
        r,M_eps,e,e_,s,ssr,t[11][11],rd,rd_cnv,
        u[11],uau,w,x,y,z;
25  double a[11][11];
    /*printf( "\n\n Householder / QR iteration \n\n ");
    printf("Step 1 -- Reduction of a matrix to Hessenberg or \n");
    printf("          tridiagonal form by Householder scheme.\n");
    printf( "\nOriginal matrix: \n");*/
30  r=1;
    for(i=1;i<=n;i++) {
       for(j=1;j<=n;j++) {
            a[i][j]=a_ini[i-1][j-1];
       /*   printf("%lf ",a[i][j]);*/}
35    /*  printf("\n");*/}
```

```
    for(ir=1;ir<=(n-2);ir++) {
       s=0;
       for(i=1;i<=n;i++) {
          u[i]=0;
5         if(i>ir+1) u[i]=a[i][ir];
          if(i>ir)   s=s+a[i][ir]*a[i][ir];}
       w=1;
       if(a[ir+1][ir]<0) w= -1;
       ssr=sqrt(s);
10     h=s+fabs(a[ir+1][ir])*ssr;
       u[ir+1]=a[ir+1][ir]+ssr*w;
       uau=0;
       for(i=1;i<=n;i++) {
          for(j=1;j<=n;j++)   {
15            uau=uau+u[i]*a[i][j]*u[j];
              if(i<=ir && j<=ir)         t[i][j]=a[i][j];
              else if (j==ir && i>=ir+2)t[i][j]=0;
              else{
                 b23=0;
20               for(k=1;k<=n;k++)
                 b23=b23-(u[i]*a[k][j]+a[i][k]*u[j])*u[k];
                 t[i][j]=a[i][j]+b23/h;}}}
       uau=uau/h/h;
       for(i=1;i<=n;i++) {
25        for(j=1;j<=n;j++) {
              a[i][j]=t[i][j]+uau*u[i]*u[j];
              if (fabs(a[i][j]) < .000001 ) a[i][j]=0;}}}
    /*printf( "\nHessenberg or tridiagonal matrix: \n");*/
    /*for(i=1; i<=n; i++) {
30        for(j=1;j<=n;j++) printf("%lf ",a[i][j]); printf("\n");}
    printf( "\nTo continue,type any number and hit RETURN key.\n");
    scanf( "%lf",&dummy);
    printf( "\nStep 2 -- QR iteration to find eigenvalues \n");*/
    /*ma=1.0;*/ /*Machine epsilon is calculated.*/
35  /*e=1.0;
```

```
        while(e>0) {   ma=ma/2; e=ma*0.98+1; e=e-1; if(e>0) M_eps=e;}
        ma=M_eps*M_eps;*/  /*squre of the machine epsilon. */
        ma=0.000001;
        printf( "Convergence criterion = %g \n\n",ma);
  5     nn=n;  rd_cnv =0.99;
        while (nn!=0) {    na=nn-1;
            for(it=1;it<=90;it++) { /*iteration loop*/
                l=1;
                for(m=nn;m>=2;m--) {
 10                 rd=fabs(a[m][m-1])/(fabs(a[m-1][m-1])+fabs(a[m][m]));
                    if(rd<ma) {
                        l=m;
                        rd_cnv = rd;}}
        /*            printf( "Iter. no.=%3d      nn=%3d      l=%3d
 15     rd_cnv=%12.3e\n",
                                            it,nn,l,rd_cnv );*/
                x=a[nn][nn];
                if(l==nn) {       /*-------Single root is found. */
                    rl[nn]=x;       im[nn]=0;
 20                 nn=nn-1;
                    goto L_1202;}
                y=a[na][na];
                r=a[nn][na]*a[na][nn];
                if( l==nn-1) {    /* -------A pair of roots is found.*/
 25                 p=(y-x)/2;       q=p*p+r;       y=sqrt(fabs(q));
                    if (q<0) {  /* ---------complex pair */
                        rl[nn-1]=x+p;    rl[nn]=x+p;
                        im[nn-1]=y;      im[nn]= -y;
                        nn=nn-2;}
 30                 else{   /* --------They are real roots. */
                        if(p<0)  y= -y;
                        y=p+y;
                        rl[nn-1]=x+y;  rl[nn]=x-r/y;
                        im[nn-1]=0;    im[nn]=0;
 35                     nn=nn-2;}
```

```
            goto L_1202;}
        if (it== 90) {
            printf( "Iteration limit exceeded.\n");
            goto L_765;}
        if(it==10 || it ==20){
            y=fabs(a[nn][nn-1])+fabs(a[nn-1][nn-2]);
            s=1.5*y;
            y=y*y;}
        else {s=x+y;
              y=x*y-r;}
        for(m=nn-2;m>=1;m--)
           {x=a[m][m];
            r=a[m+1][m];
            z=a[m+1][m+1];
            p=x*(x-s)+y+r*a[m][m+1];
            q=r*(x+z-s);
            r=r*a[m+2][m+1];
            w=fabs(p)+fabs(q)+fabs(r);
            p=p/w;   q=q/w;    r=r/w;
            if(m==1) break;
            hh=fabs(a[m][m-1])*(fabs(q)+fabs(r));
    if(hh<ma*fabs(p)*(fabs(a[m-1][m-1])+fabs(x)+fabs(z)))
                        break;}
        for(i=m+2;i<=nn;i++)   a[i][i-2]=0;
        for(i=m+3;i<=nn;i++)   a[i][i-3]=0;
        for(k=m;k<=nn-1;k++) {
            if(k != m){
               p=a[k][k-1];  q=a[k+1][k-1];    r=a[k+2][k-1];
               if(nn-1 == k ) r=0;
               x=fabs(p)+fabs(q)+fabs(r);
               if(x == 0) break;
               p=p/x; q=q/x; r=r/x;}
            s=sqrt(p*p+q*q+r*r);
            if (p<0)   s= -s;
            if(k!=m)   a[k][k-1] = -s*x;
```

```
                    if(l!=m)  a[k][k-1] = -a[k][k-1];
                    p=p+s;   x=p/s;   y=q/s;
                    z=r/s;   q=q/p;   r=r/p;
                    for(j=k; j<=nn; j++) {
                        p=a[k][j]+q*a[k+1][j];
                        if(nn-1 != k) {
                            p=p+r*a[k+2][j];
                            a[k+2][j]=a[k+2][j]-p*z;}
                            a[k+1][j]=a[k+1][j]-p*y;
                            a[k][j]=a[k][j]-p*x;}
                    j=nn; if(k+3 <nn)     j=k+3;
                    for(i=1;i<=j;i++) {
                        p=x*a[i][k]+y*a[i][k+1];
                        if (nn-1 != k) {
                            p=p+z*a[i][k+2];
                            a[i][k+2]=a[i][k+2]-p*r;}
                        a[i][k+1]=a[i][k+1]-p*q;
                        a[i][k]=a[i][k]-p;}}}
        L_1202:;}
 L_765:/*   printf( "\nEigenvalues: \n");
            printf("-------------------------------------------\n");
            printf("NO.      Real part        Imaginary part \n");
            printf("-------------------------------------------\n");
            for(i=1; i<=n;i++)
                printf(    "%3d           %12.5e              %12.5e \n",i,rl[i],im[i]);
            printf("-------------------------------------------\n");
            printf("\nReduced matrix: \n");*/
            for(j=1;j<=n;j++) {
                for(i=j+1;i<=n;i++) {
                    if(fabs(a[i][j])<   fabs(a[j][j])*1.0e-10)   a[i][j]=0.0;}}
        /*  for(i=1;i<=n;i++) {
                for(j=1;j<=n;j++)       printf(    "%lf ", a[i][j]);
                printf( "\n");}
```

```
                    printf("\n\n\n");*/
                    return;}
        /*********************************************/
        void gauss(n,a_ini,vec)
 5      int n;
        double a_ini[][8],vec[8];
        {int i,j,jc,jr,k,kc,nv,pv;
         double det,eps,ep1,eps2,r,temp,tm,va,a[8][8];
        printf("-----------------------------------------\n");
10      for(i=1;i<=n;i++) {
            for(j=1;j<=n+1;j++) {
                a[i][j]=a_ini[i-1][j-1]; /* printf("%lf   ",a[i][j]);*/}
        /*  printf("\n");*/}
            eps=1.0; ep1=1.0;        /* eps=machine epsilon */
15          while(ep1>0) {
                eps=eps/2.0;  ep1=eps*0.98+1; ep1=ep1-1;}
            eps=eps*2;    eps2=eps*2;
            printf("          Machine epsilon=%g \n",eps);
            det=1;                    /* Initialization of determinant */
20          for(i=1;i<=(n-1);i++) {
              pv=i;
              for(j=i+1;j<=n;j++)  {
                 if(fabs( a[pv][i])<fabs(a[j][i]))  pv=j;}
              if (pv!=i)  {
25               for(jc=1;jc<=(n+1);jc++) {
                    tm=a[i][jc]; a[i][jc]=a[pv][jc];  a[pv][jc]=tm;}
                 det= -det;}
                 if(a[i][i] == 0) {          /* Singular matrix */
                    printf( "Matrix is singular.\n");  exit(0);}
30               for(jr=i+1;  jr<=n;jr++)   {          /* Elimination of below-diagonal.*/
                    if(a[jr][i] != 0 ) {
                       r=a[jr][i]/a[i][i];
                       for(kc=i+1;kc<= (n+1);kc++) {
35                        temp=a[jr][kc];
```

```
                        a[jr][kc]=a[jr][kc]-r*a[i][kc];
                        if(fabs(a[jr][kc])< eps2*temp)  a[jr][kc]=0.0;
   /*        if the result of subtraction is smaller than 2 times
   machine
            epsilon times the original value, it is set to zero.*/}}}}
        for(i=1;i<=n;i++) {
            det=det*a[i][i];        /* Determinant is calculated.*/}
        if(det == 0) {
            printf( "Matrix is singular.\n");  exit(0);}
        else {              /*Backward substitution starts.*/
            a[n][n+1]=a[n][n+1]/a[n][n];
            for(nv=n-1;nv>=1;nv--)  {
                va=a[nv][n+1];
                for(k=nv+1;k<=n;k++) { va= va-a[nv][k]*a[k][n+1];}
                a[nv][n+1]=va/a[nv][nv];}
            printf( "         Determinant= %g \n", det);}
        for(i=1;i<=n;i++)
        { vec[i]=a[i][n+1];}
            return;}
   /***** This subroutine transposes a matrix *****/
   void transpose(m,n,a,at)
   int m,n;
   double a[][8],at[][400];
   {
   int i,j;
       for(i=0;i<n;i++)
       {    for(j=0;j<m;j++)
            { at[i][j]=a[j][i];}}
        return;}
   /***** This subroutine multiplies two matrices *****/
   void multi(l,m,AA,n,BB,AB)
   int l,m,n;
   double AA[][400],BB[][8],AB[][8];
   {
   int i,j,k;
```

```
        for(i=0;i<l;i++)
        {   for(j=0;j<n;j++)
              { AB[i][j]=0;}}
        for(i=0;i<l;i++)
5       {   for(j=0;j<n;j++)
              { for(k=0;k<m;k++)
                 { AB[i][j]=AB[i][j]+AA[i][k]*BB[k][j];}}}
        return;}
```

What is claimed is:

1. An apparatus for creating a three-dimensional image of an object surface, the apparatus comprising:

a light source adapted to train a projected light ray upon an object surface to produce an illuminated point on the object surface;

a video camera having an optical axis, a focal length and a vanishing point, the optical axis of the video camera being substantially parallel to the projected light ray, said video camera also having a sensor matrix defining a sensor matrix plane which is substantially perpendicular to the optical axis of the video camera, the vanishing point of the video camera being substantially at the focal length distance from the sensor matrix plane along the optical axis of the video camera toward the object;

means for determining a source point corresponding to the intersection of the sensor matrix plane and the line defined by the projected light rays wherein the vanishing point and the source point define a vanishing point line;

means for determining a sensed point lying in the sensor matrix plane and corresponding to the illuminated point on the object surface;

processing means for determining a normal line perpendicular to the sensor matrix plane and passing through the sensed point, and for computing three-dimensional image coordinates for the image point defined by the intersection of the normal line with the vanishing point line; and transformation means for converting the three-dimensional image coordinates into three-dimensional object coordinates representing the object surface.

2. The apparatus of claim 1 wherein said processing means computes $Z_B$ coordinates of the three-dimensional image coordinates in accordance with the formula:

$$Z_B = f\left[1 - \sqrt{\frac{X_B^2 + Y_B^2}{X_A^2 + Y_A^2}}\right]$$

wherein $X_B$ and $Y_B$ are coordinates of the image points in the plane of the sensor matrix, f is the focal length of said video camera, and $X_A$ and $Y_A$ are coordinates the intersection of the light rays and the plane of the sensor matrix.

3. The apparatus of claim 1 wherein said transformation means computes three-dimensional object coordinates in accordance with the matrix equation:

$$[HX_R \, HY_R \, HZ_R \, H] = [X_B \, Y_B \, Z_B \, 1] \begin{bmatrix} 1 & 0 & 0 & 0 \\ 0 & 1 & 0 & 0 \\ 0 & 0 & 1 & -\frac{1}{f} \\ 0 & 0 & 0 & 1 \end{bmatrix}$$

wherein $X_R$, $Y_R$ and $Z_R$ are three-dimensional real object coordinates, $X_B$, $Y_B$ and $Z_B$ are three-dimensional image coordinates, and f is the focal length of said video camera.

4. The apparatus of claim 1 further comprising:

means for calibrating said video camera.

5. The apparatus of claim 1 wherein the light source is movable in order to successively project a light ray upon different points of the object surface.

6. The apparatus of claim 1 further comprising:

a computer system having a video monitor and means for computing, storing and displaying data related to imaging the object surface.

7. The apparatus of claim 1 wherein said light source further comprises:

a laser projecting light having a wavelength of approximately 670 nanometers.

8. The apparatus of claim 1 wherein said light source further comprises:

a plurality of lasers arranged in an array to project parallel laser rays; and means for sequentially actuating each one of said lasers.

9. The apparatus of claim 8 wherein each one of said lasers projects light having a wavelength of approximately 670 nanometers.

10. The apparatus of claim 1 further comprising:

means for computing a centroid for each one of the image areas of the sensor matrix to identify a corresponding image point within the plane of the sensor matrix.

11. A method of imaging an object surface, the steps of the method comprising:

training a projected light ray upon an object surface to produce an illuminated point on the object surface;

providing a video camera having an optical axis, a focal length, a vanishing point and a sensor matrix, the optical axis being parallel to the projected light ray, the sensor matrix defining a sensor matrix plane perpendicular to the projected light ray, the vanishing point being at the focal length distance from the sensor matrix plane along the optical axis toward the object;

determining a source point corresponding to the intersection of the sensor matrix plane and the line defined by the projected light ray, wherein the vanishing point and the source point define a vanishing point line;

viewing the object surface with the video camera to determine a sensed point lying in the sensor matrix plane and corresponding to the illuminated point on the object surface;

defining a normal line perpendicular to the sensor matrix plane and passing through the sensed point lying in the sensor matrix plane;

determining an image point corresponding to the intersection of the normal line with the vanishing point line;

computing three-dimensional image coordinates corresponding to the image point; and transforming the three-dimensional image coordinates into three-dimensional object coordinates representing the illuminated point on the object surface.

12. The method of claim 11 further comprising the step of:

calibrating said video camera.

13. The method of claim 11 wherein the step of determining image points comprises the step of:

computing the centroid of each one of the image areas of the sensor matrix.

14. The method of claim 11 wherein the step of computing three-dimensional image coordinates comprises the step of:

computing a perspective image coordinate $Z_B$ according to the equation:

$$Z_B = f\left[1 - \sqrt{\frac{X_B^2 + Y_B^2}{X_A^2 + Y_A^2}}\right].$$

15. The method of claim 11 wherein the step of transforming three-dimensional image coordinates comprises the step of:

converting three-dimensional image coordinates into three-dimensional real object coordinates according to the matrix equation:

$$[HX_R\ HY_R\ HZ_R\ H] = [X_B\ Y_B\ Z_B\ 1] \begin{bmatrix} 1 & 0 & 0 & 0 \\ 0 & 1 & 0 & 0 \\ 0 & 0 & 1 & -\frac{1}{f} \\ 0 & 0 & 0 & 1 \end{bmatrix}$$

16. A method of creating a three-dimensional image of an object surface, the steps of the method comprising:

projecting a plane of light upon an object surface to produce a stripe comprising a plurality of illuminated points on the object surface;

providing a video camera having an optical axis, a focal length, a vanishing point and a sensor matrix, the optical axis being parallel to the plane of light, the vanishing point being a focal length distance from the sensor matrix along the optical axis toward the object, the sensor matrix defining a sensor matrix plane substantially perpendicular to the plane of light;

determining a plurality of source points, each one of the source points lying on the line defined by the intersection of the sensor matrix plane with the plane defined by the projected plane of light, wherein the vanishing point and each one of the source points define a corresponding vanishing point line;

viewing the object surface with the video camera to obtain an image stripe comprising a plurality of sensed points lying in the sensor matrix plane, each one of the sensed points corresponding to one of the illuminated points on the object surface;

defining a normal line corresponding to each one of the sensed points, each normal line being perpendicular to the sensor matrix plane and passing through the corresponding one of the sensed points;

determining a plurality of image points, each one of the image points corresponding to the intersection of the vanishing point line for the corresponding one of the source points and the normal line for the corresponding one of the sensed points;

computing three-dimensional image coordinates for each one of the image points; and transforming the three-dimensional image coordinates into three-dimensional object coordinates representing the object surface.

17. An apparatus for creating a three-dimensional image of an object surface, the apparatus comprising:

a light source adapted to train a plane of light upon an object surface to produce a stripe consisting of a plurality of illuminated points on the object surface;

a video camera having an optical axis, a focal length and a vanishing point, the optical axis of the video camera being substantially parallel to the projected plane of light, the video camera also having a sensor matrix defining a sensor matrix plane which is substantially perpendicular to the optical axis of the video camera, the vanishing point of the video camera being substantially at the focal length distance from the sensor matrix plane along the optical axis of the video camera toward the object;

means for determining a plurality of source points lying on the line defined by the intersection of the sensor matrix plane with the plane defined by the projected plane of light, wherein the vanishing point and each one of the source points define a corresponding vanishing point line;

means for determining a plurality of sensed points lying in the sensor matrix plane, each one of the sensed points corresponding to one of the illuminated points on the object surface;

processing means for determining a plurality of normal lines perpendicular to the sensor matrix plane wherein each one of the normal lines passes through a corresponding one of the sensed points, and for computing three-dimensional image coordinates for a plurality of image points wherein each one of the image points is defined by the intersection of a corresponding one of the normal lines with the vanishing point line; and transformation means for converting the three-dimensional image coordinates into three-dimensional object coordinates representing the object surface.

\* \* \* \* \*

UNITED STATES PATENT AND TRADEMARK OFFICE
CERTIFICATE OF CORRECTION

PATENT NO. : 5,513,276
DATED : April 30, 1996
INVENTOR(S) : Theodoracatos

It is certified that error appears in the above-identified patent and that said Letters Patent is hereby corrected as shown below:

Column 3,
Line 4, please delete "by".

Column 7,
Line 50, please delete "$\delta$" and substitute therefor -- $\delta_u$ --.

Column 8,
Line 55, equation (20), please delete "$B^t A^{-1} A^t C$" and substitute therefor
-- $B^t A (A^t A)^{-1} A^t C$ --.

Column 10,
Line 6, please delete "a are" and substitute therefor -- A are --.

Column 67,
Line 19, please delete "rays" and substitute therefor -- ray, --.
Line 44, after "coordinates" please insert -- of --.
Line 56, please delete "$Z_B$" and substitute therefor -- $Z_R$ --.

Signed and Sealed this

Seventh Day of December, 2004

JON W. DUDAS
*Director of the United States Patent and Trademark Office*